United States Patent
Amini et al.

(10) Patent No.: US 8,848,624 B2
(45) Date of Patent: Sep. 30, 2014

(54) MULTI-USER UPLINK COMMUNICATIONS WITHIN MULTIPLE USER, MULTIPLE ACCESS, AND/OR MIMO WIRELESS COMMUNICATION SYSTEMS

(75) Inventors: Peiman Amini, Mountain View, CA (US); Joonsuk Kim, Saratoga, CA (US); Matthew James Fischer, Mountain View, CA (US); Joseph Paul Lauer, North Reading, MA (US); Vinko Erceg, Cardiff by the Sea, CA (US)

(73) Assignee: Broadcom Corporation, Irvine, CA (US)

( * ) Notice: Subject to any disclaimer, the term of this patent is extended or adjusted under 35 U.S.C. 154(b) by 420 days.

(21) Appl. No.: 12/858,357

(22) Filed: Aug. 17, 2010

(65) Prior Publication Data

US 2011/0164597 A1    Jul. 7, 2011

Related U.S. Application Data

(60) Provisional application No. 61/234,394, filed on Aug. 17, 2009.

(51) Int. Cl.
| | | |
|---|---|---|
| H04W 4/00 | (2009.01) | |
| H04J 3/00 | (2006.01) | |
| H04L 1/00 | (2006.01) | |
| H04L 27/26 | (2006.01) | |
| H04W 56/00 | (2009.01) | |

(52) U.S. Cl.
CPC ............ *H04L 1/0041* (2013.01); *H04L 1/0045* (2013.01); *H04L 27/2627* (2013.01); *H04L 27/2607* (2013.01); *H04L 27/2662* (2013.01); *H04L 27/2657* (2013.01); *H04W 56/0035* (2013.01); *H04L 27/2689* (2013.01); *H04L 27/2649* (2013.01)
USPC ............................ 370/329; 370/338; 370/345

(58) Field of Classification Search
None
See application file for complete search history.

(56) References Cited

U.S. PATENT DOCUMENTS

| | | | |
|---|---|---|---|
| 2007/0002800 A1* | 1/2007 | Sondur et al. | 370/332 |
| 2010/0056069 A1* | 3/2010 | Toshimitsu et al. | 455/75 |
| 2010/0329236 A1* | 12/2010 | Sampath et al. | 370/350 |

* cited by examiner

*Primary Examiner* — Derrick Ferris
*Assistant Examiner* — Kodzovi Acolatse
(74) *Attorney, Agent, or Firm* — Garlick & Markison; Kevin L. Smith

(57) ABSTRACT

Multi-user uplink communications within multiple user, multiple access, and/or MIMO wireless communication systems. Within such communication systems, uplink communications from various receiving wireless communication devices (e.g., STAs) to a transmitting wireless communication device (e.g., AP) may occur in any of a number of various dimensions or combinations thereof including MU-MIMO dimension and frequency dimension (asynchronous FDM or synchronous FDM). In accordance with such uplink communications, various considerations such as time synchronization, frequency synchronization, and/or power control (including wireless communication device grouping). When performing uplink asynchronous FDM signaling, power control as grouping is used. When performing uplink synchronous FDM signaling, time synchronization, frequency synchronization, and power control (such as including wireless communication device grouping) is performed.

23 Claims, 25 Drawing Sheets

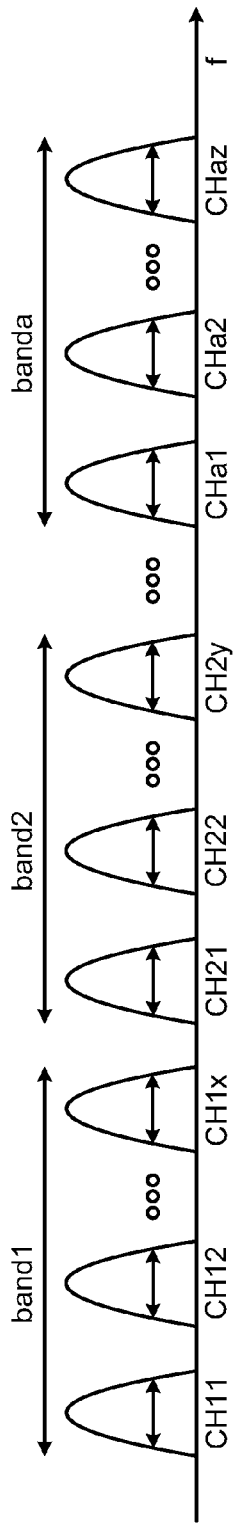
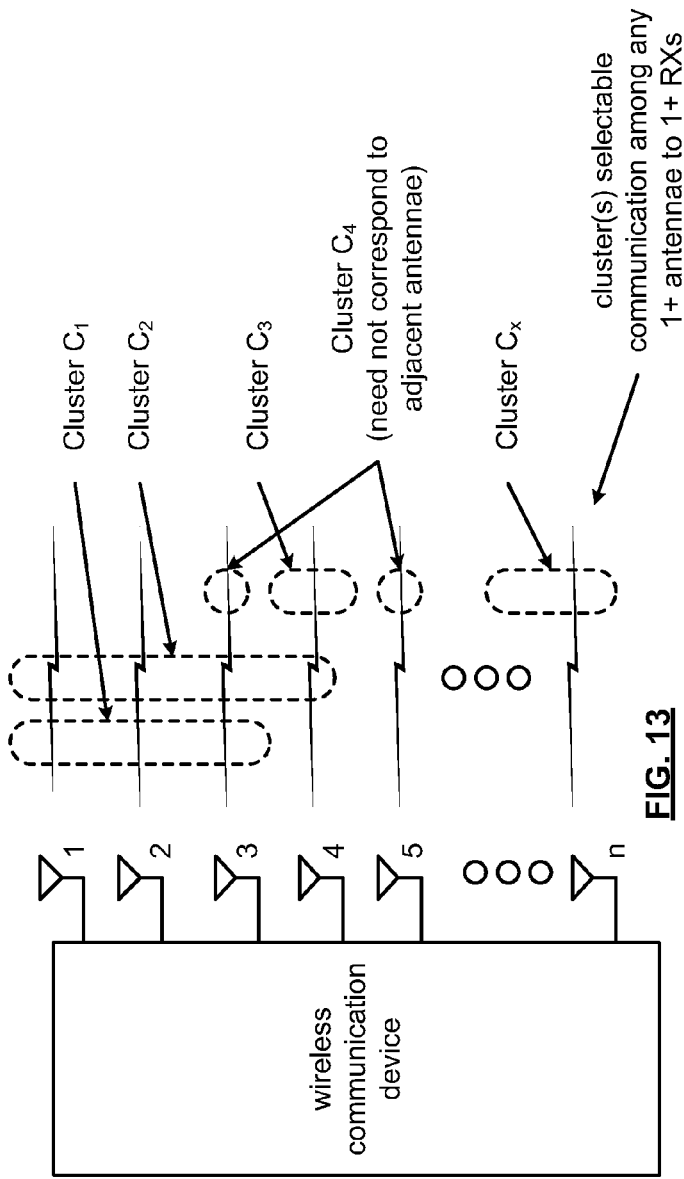
FIG. 13

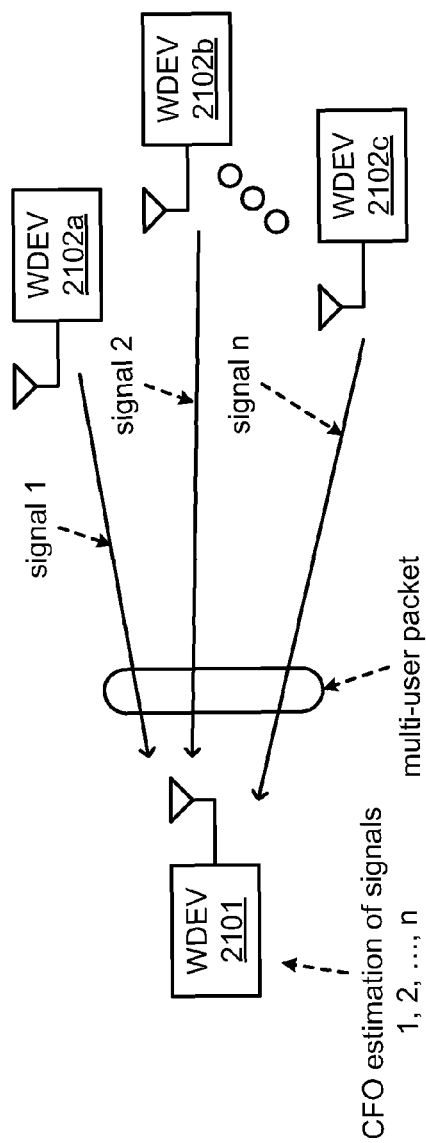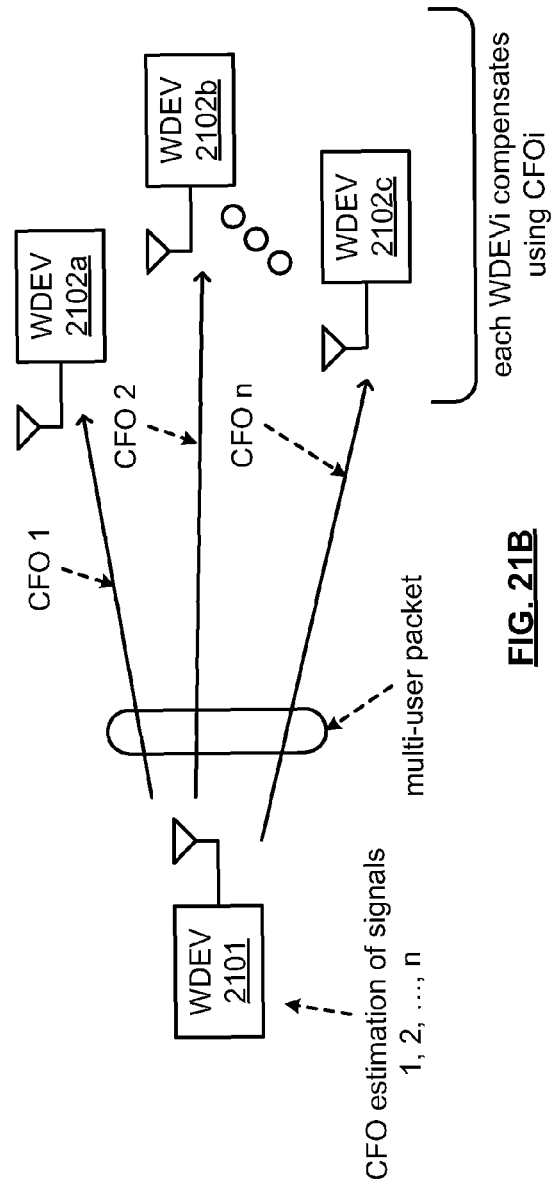

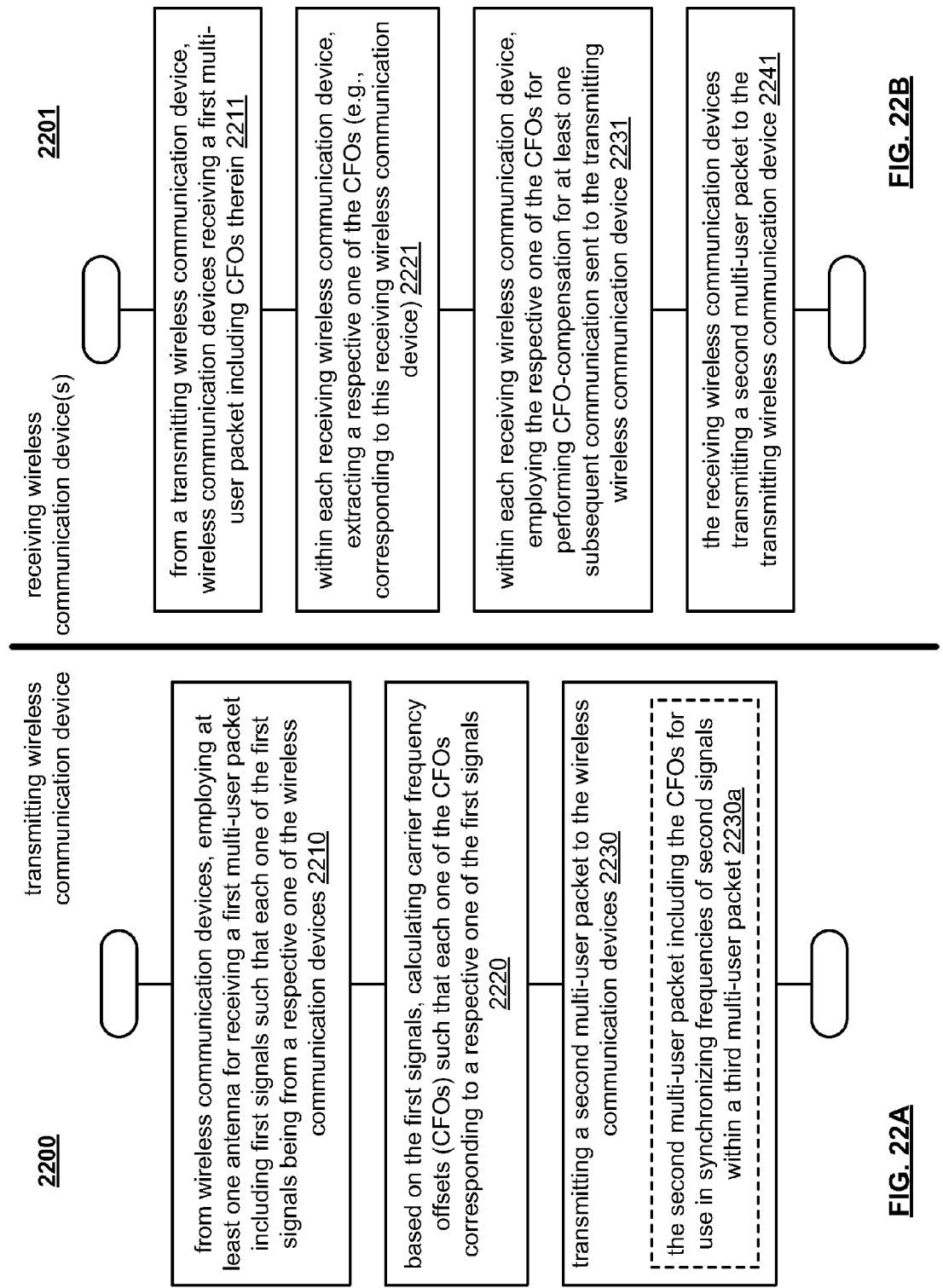

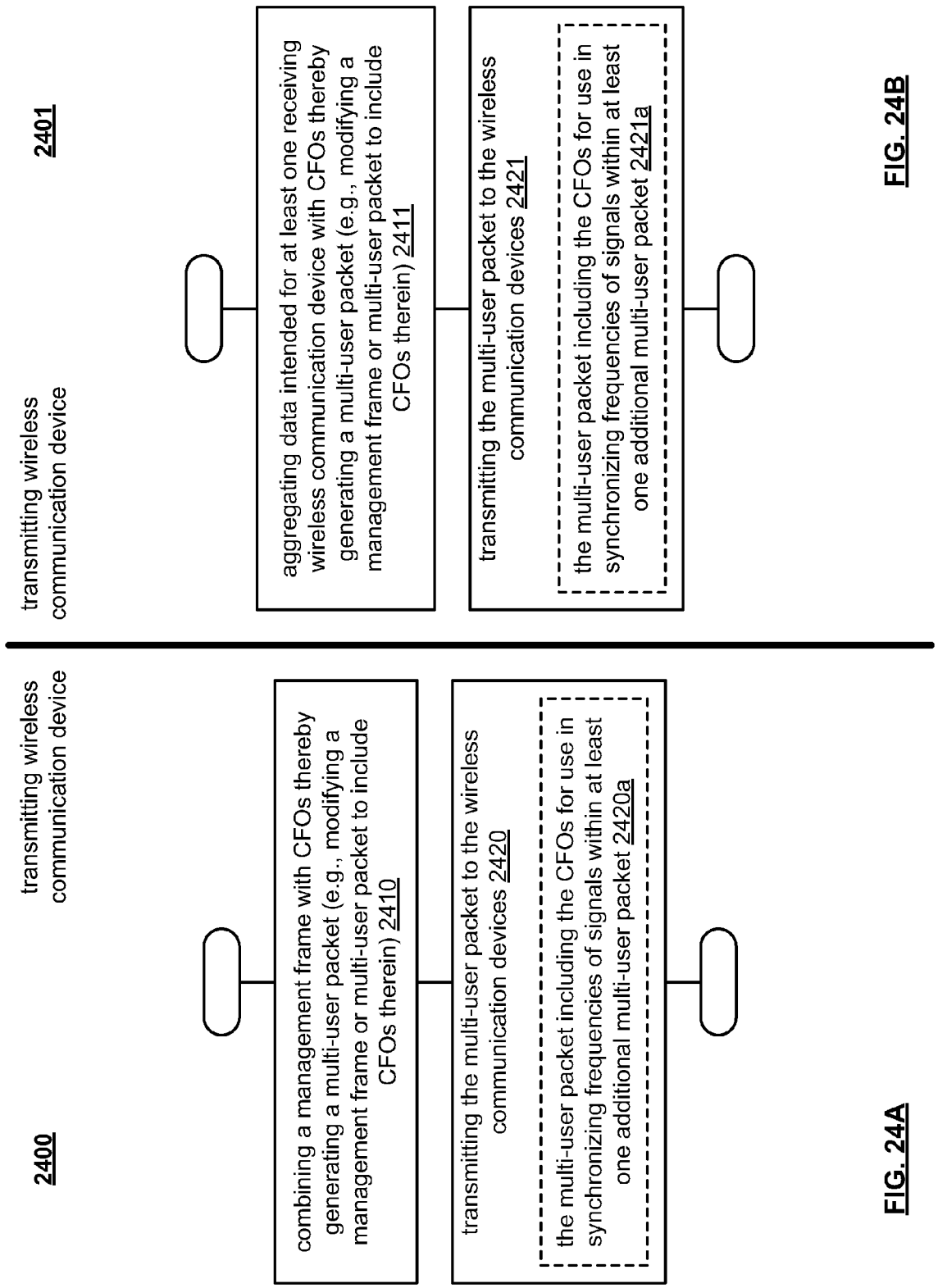

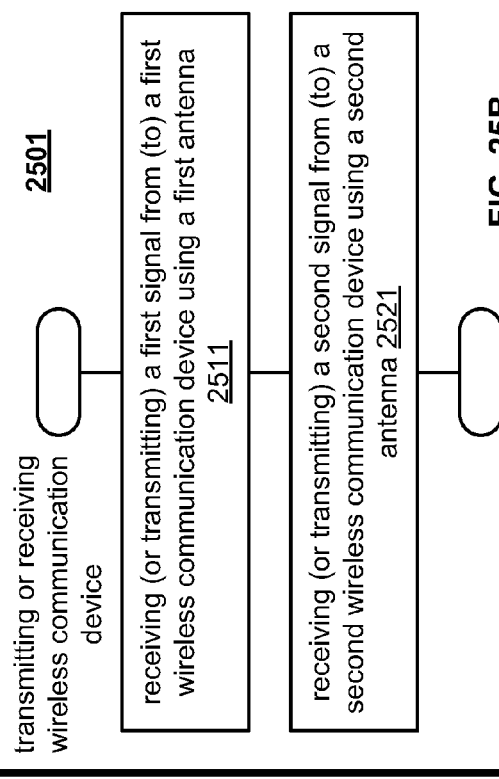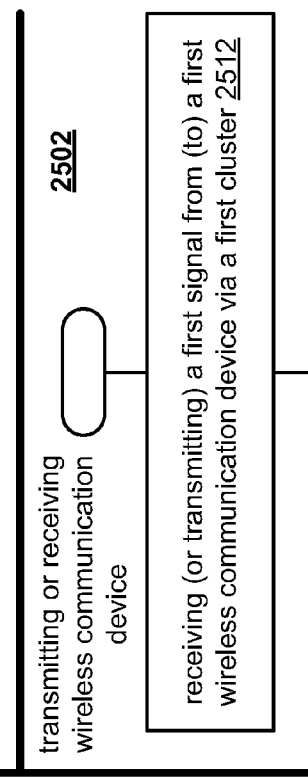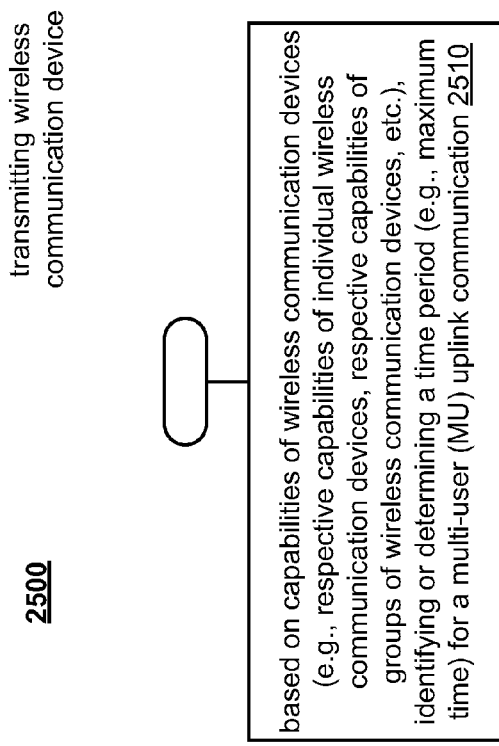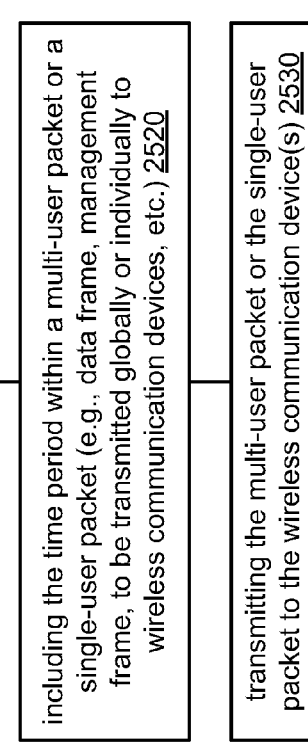
FIG. 25A / FIG. 25B / FIG. 25C

MULTI-USER UPLINK COMMUNICATIONS WITHIN MULTIPLE USER, MULTIPLE ACCESS, AND/OR MIMO WIRELESS COMMUNICATION SYSTEMS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:

1. U.S. Provisional Application Ser. No. 61/234,394, entitled "WLAN multi user uplink transmission," filed Aug. 17, 2009, now expired.

Incorporation by Reference

The following U.S. Utility patent applications are hereby incorporated herein by reference in their entirety and are made part of the present U.S. Utility patent application for all purposes:

1. U.S. Utility patent application Ser. No. 12/794,711, entitled "Transmission acknowledgement within multiple user, multiple access, and/or MIMO wireless communications," filed concurrently on Jun. 4, 2010, issued as U.S. Pat. No. 8,498,359, on Jul. 30, 2013.

2. U.S. Utility patent application Ser. No. 12/816,352, entitled "Carrier sense multiple access (CSMA) for multiple user, multiple access, and/or MIMO wireless communications," filed on Jun. 15, 2010, issued as U.S. Pat. No. 8,804,495, on Aug. 12, 2014.

3. U.S. Utility patent application Ser. No. 12/817,118, entitled "Scheduled clear to send (CTS) for multiple user, multiple access, and/or MIMO wireless communications," filed on Jun. 16, 2010, issued as U.S. Pat. No. 8,582,485, on Nov. 12, 2013.

4. U.S. Utility patent application Ser. No. 12/821,094, entitled "Medium accessing mechanisms within multiple user, multiple access, and/or MIMO wireless communications," filed on Jun. 22, 2010, issued as U.S. Pat. No. 8,441,975, on May 14, 2013.

5. U.S. Utility patent application Ser. No. 12/854,457, entitled "Mixed mode operations within multiple user, multiple access, and/or MIMO wireless communications," filed on Aug. 11, 2010, pending.

Incorporation by Reference

The following IEEE standard is hereby incorporated herein by reference in its entirety and is made part of the present U.S. Utility patent application for all purposes:

1. IEEE 802.11-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1232 pages.

BACKGROUND OF THE INVENTION

1. Technical Field of the Invention

The invention relates generally to communication systems; and, more particularly, it relates to multi-user uplink communications within multiple user, multiple access, and/or multiple input multiple output (MIMO) wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 13 is a diagram illustrating an embodiment of a wireless communication device, and clusters, as may be employed for supporting communications with at least one additional wireless communication device.

FIG. 15 is a diagram illustrating an embodiment of a wireless communication system in which various wireless communication devices are categorized into groups based on the power of signals received there from.

FIG. 21A and FIG. 21B are diagrams illustrating embodiments of a wireless communication system in which carrier frequency offset (CFO) compensation is performed to effectuate frequency synchronization.

FIG. 22A, FIG. 22B, FIG. 23A, FIG. 23B, FIG. 24A, FIG. 24B, FIG. 25A, FIG. 25B, and FIG. 25C are diagrams illustrating various embodiments of methods for operating one or more wireless communication devices.

DETAILED DESCRIPTION OF THE INVENTION

Figure 1:
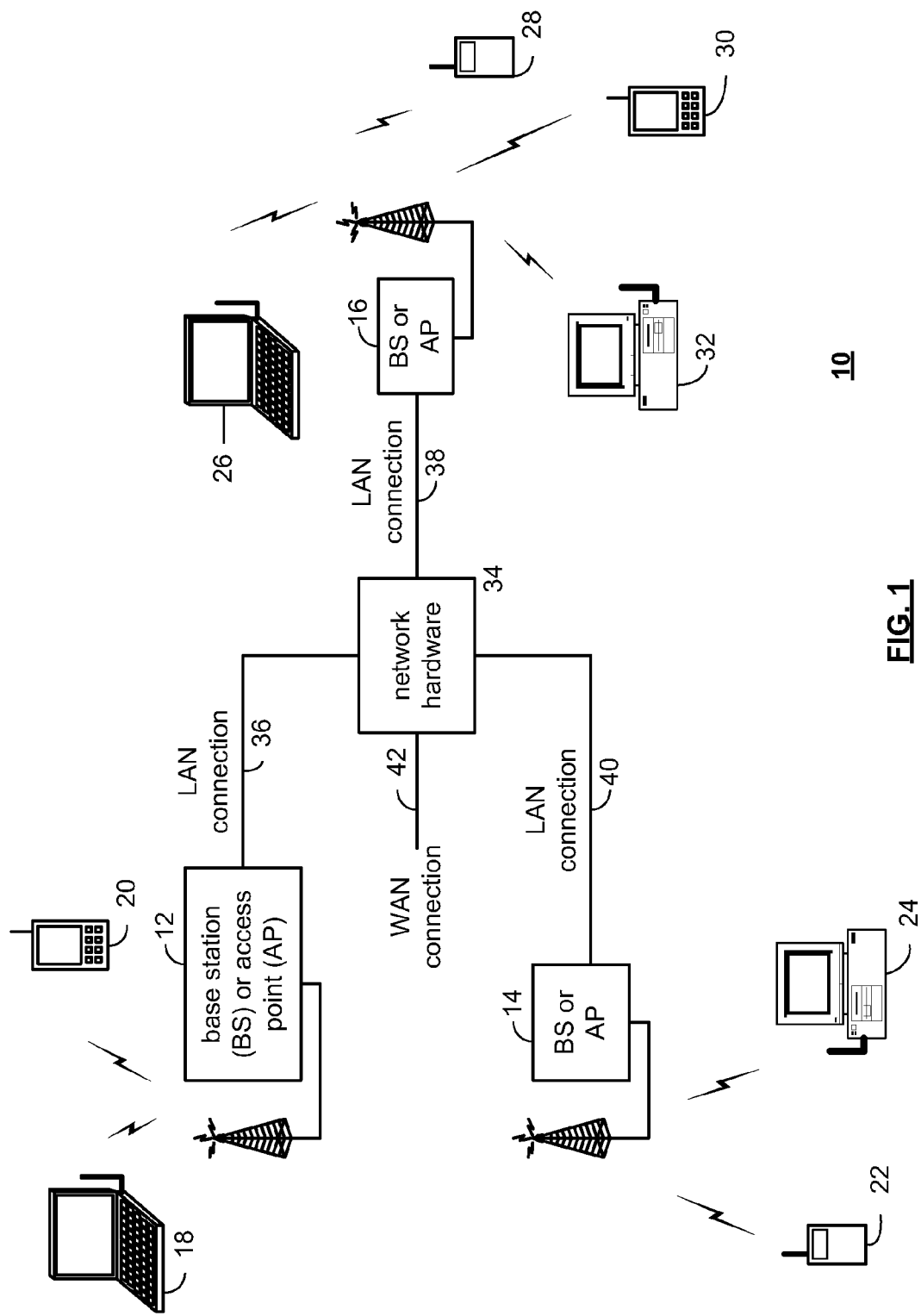
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
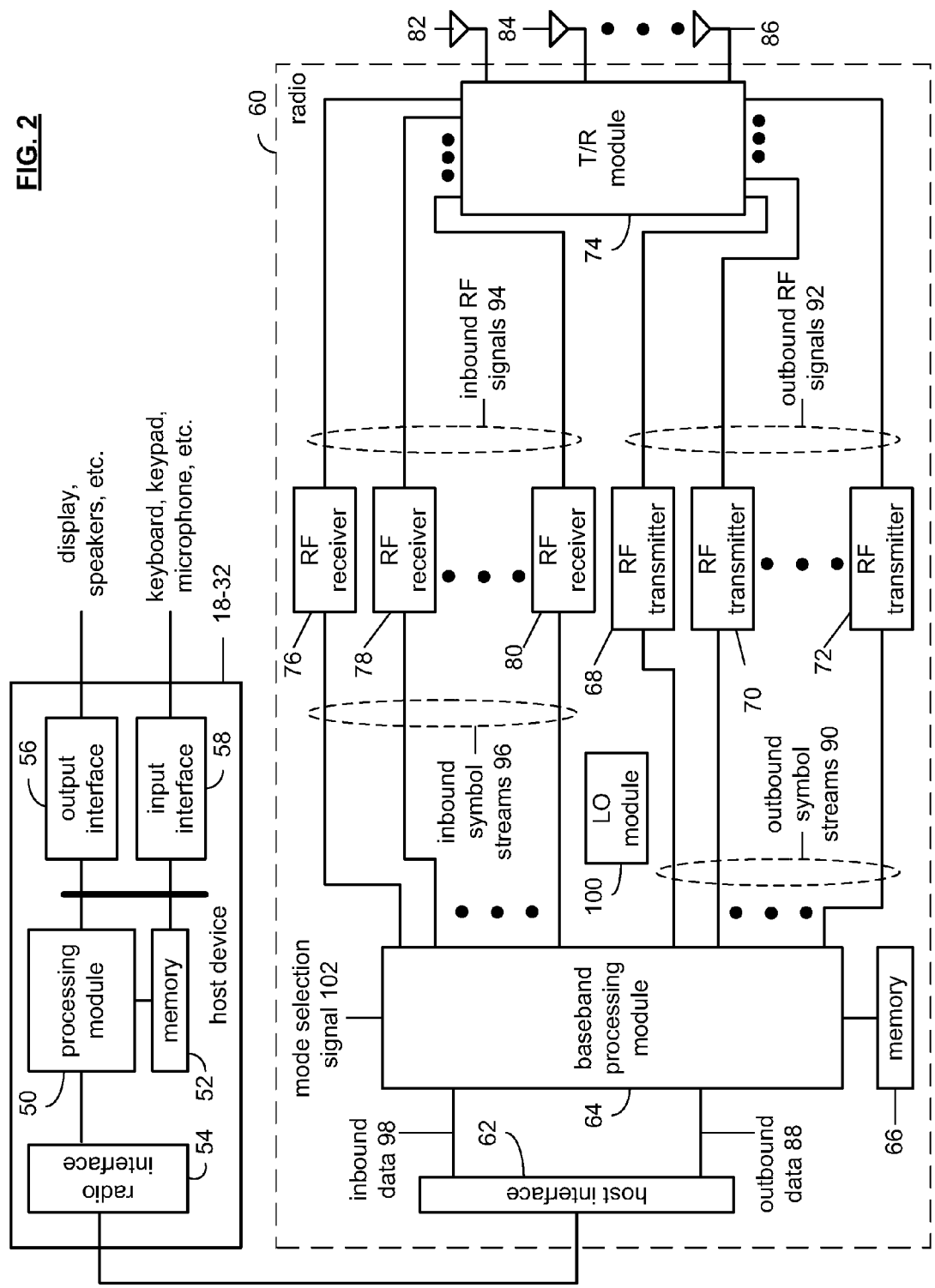
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables (see APPENDIX B), which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
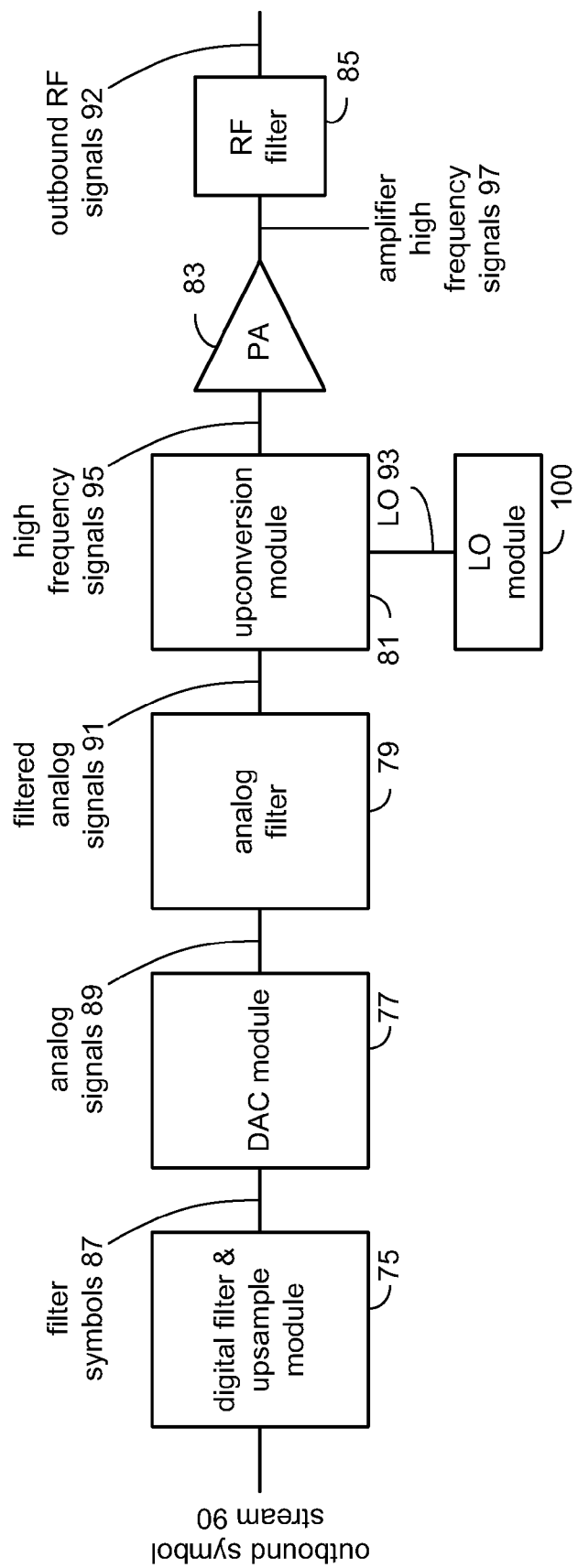
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
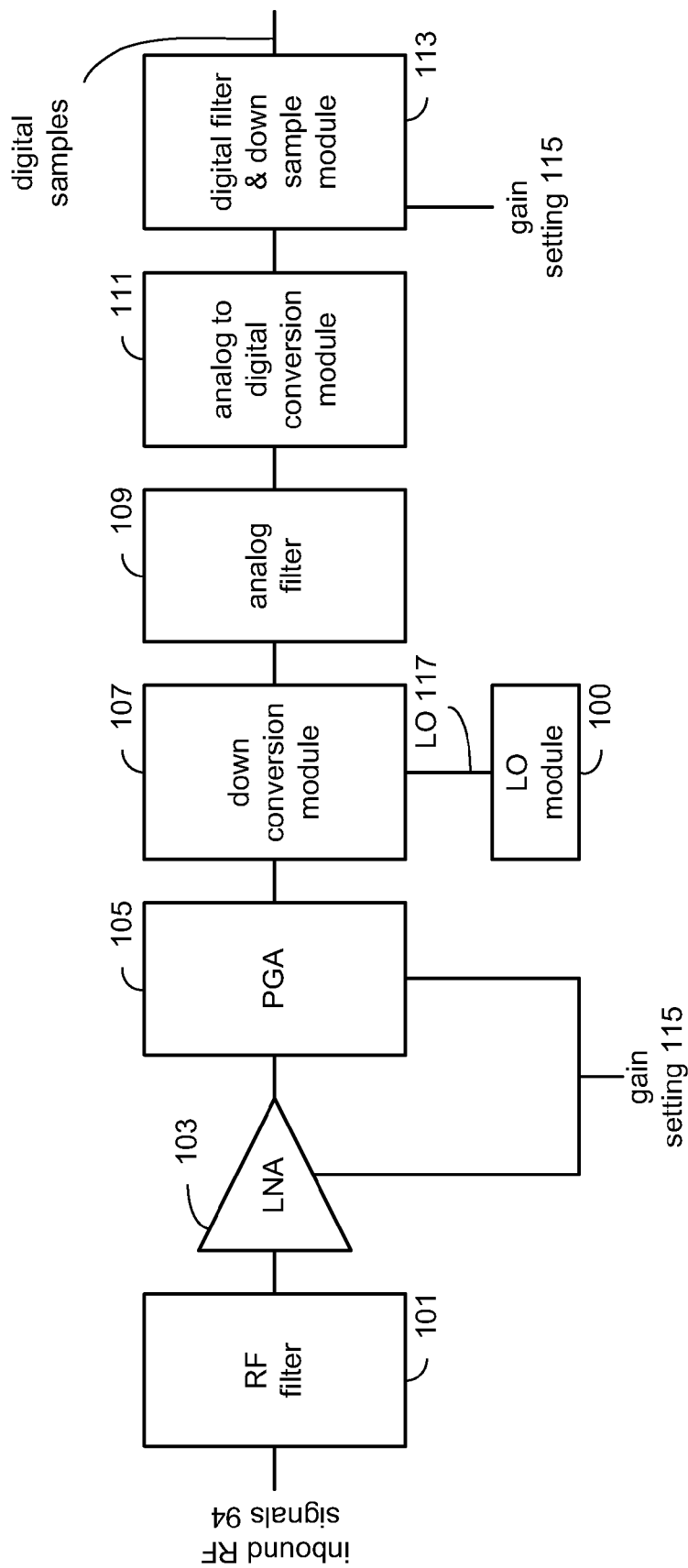
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
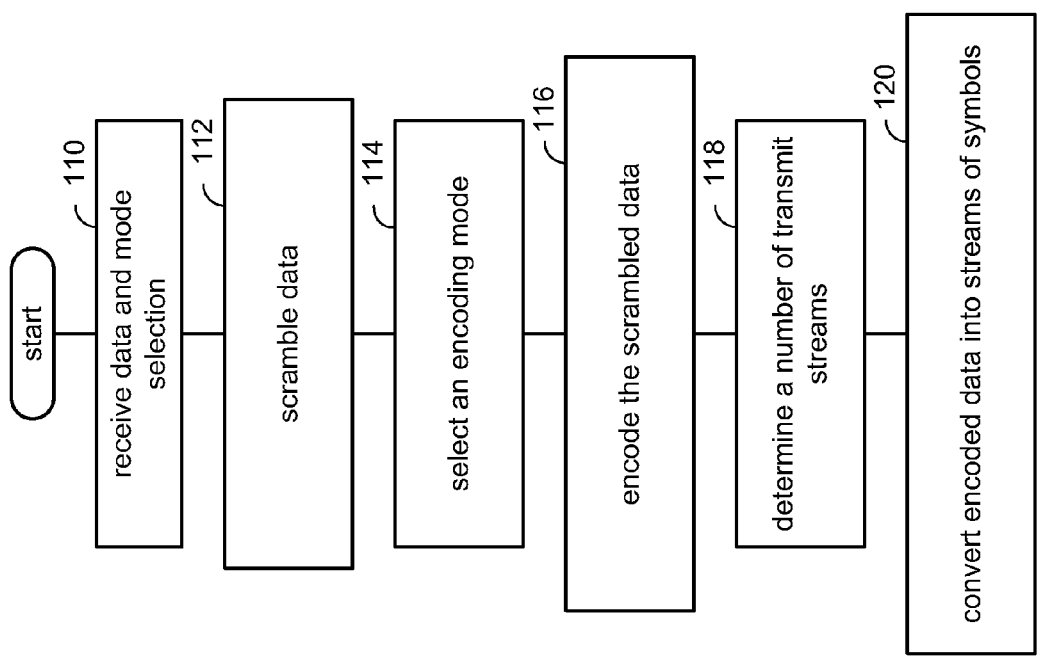
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
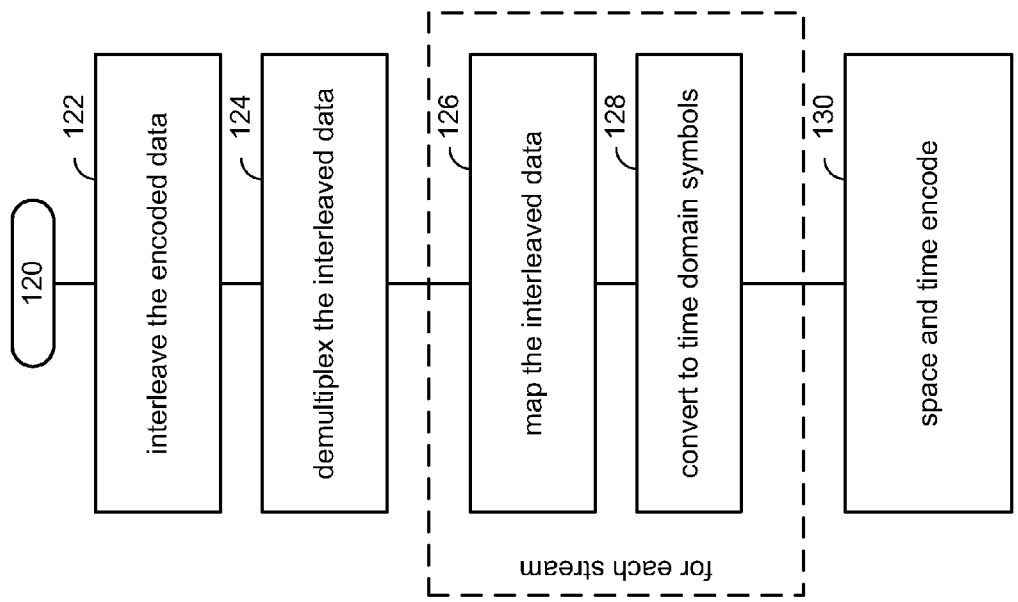
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \cdots & C_{2M-1} & C_{2M} \\ -C_2^* & C_1^* & -C_4^* & C_3^* & \cdots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
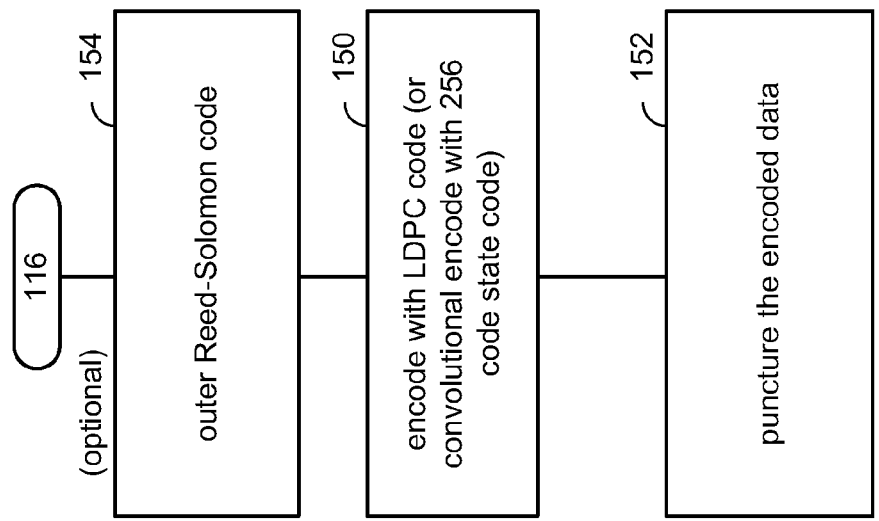
FIGS. 7-9 are diagrams illustrating various embodiments for encoding the scrambled data.
Figure 8:
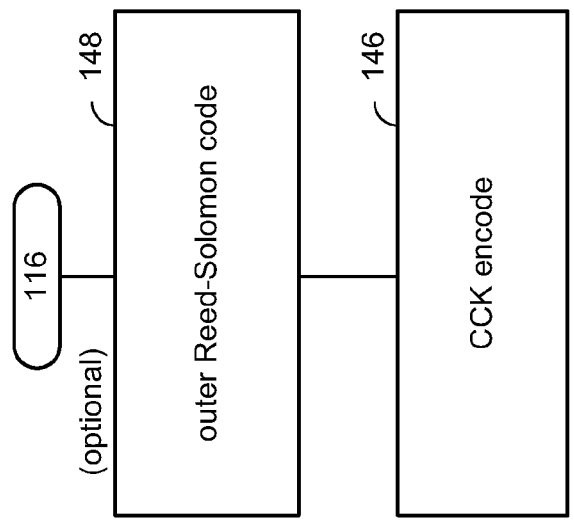
Figure 7:
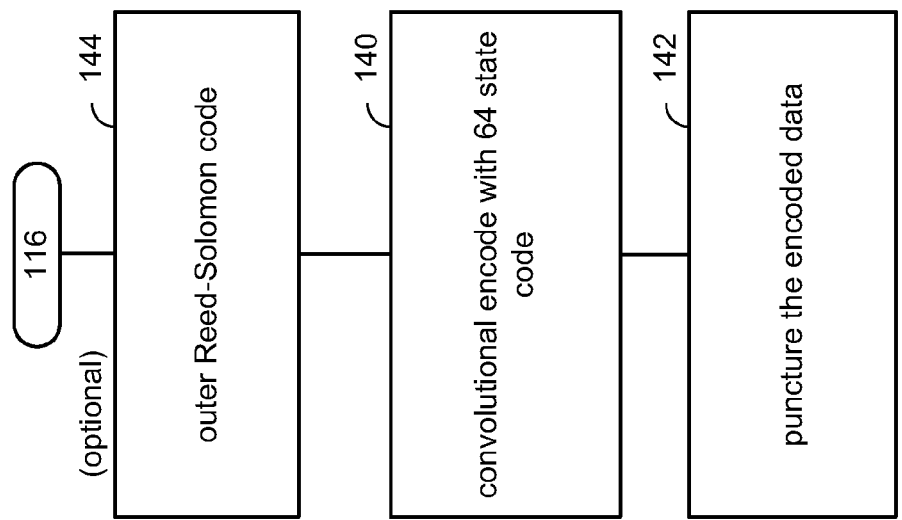

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include 1/2, 2/3 and/or 3/4, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
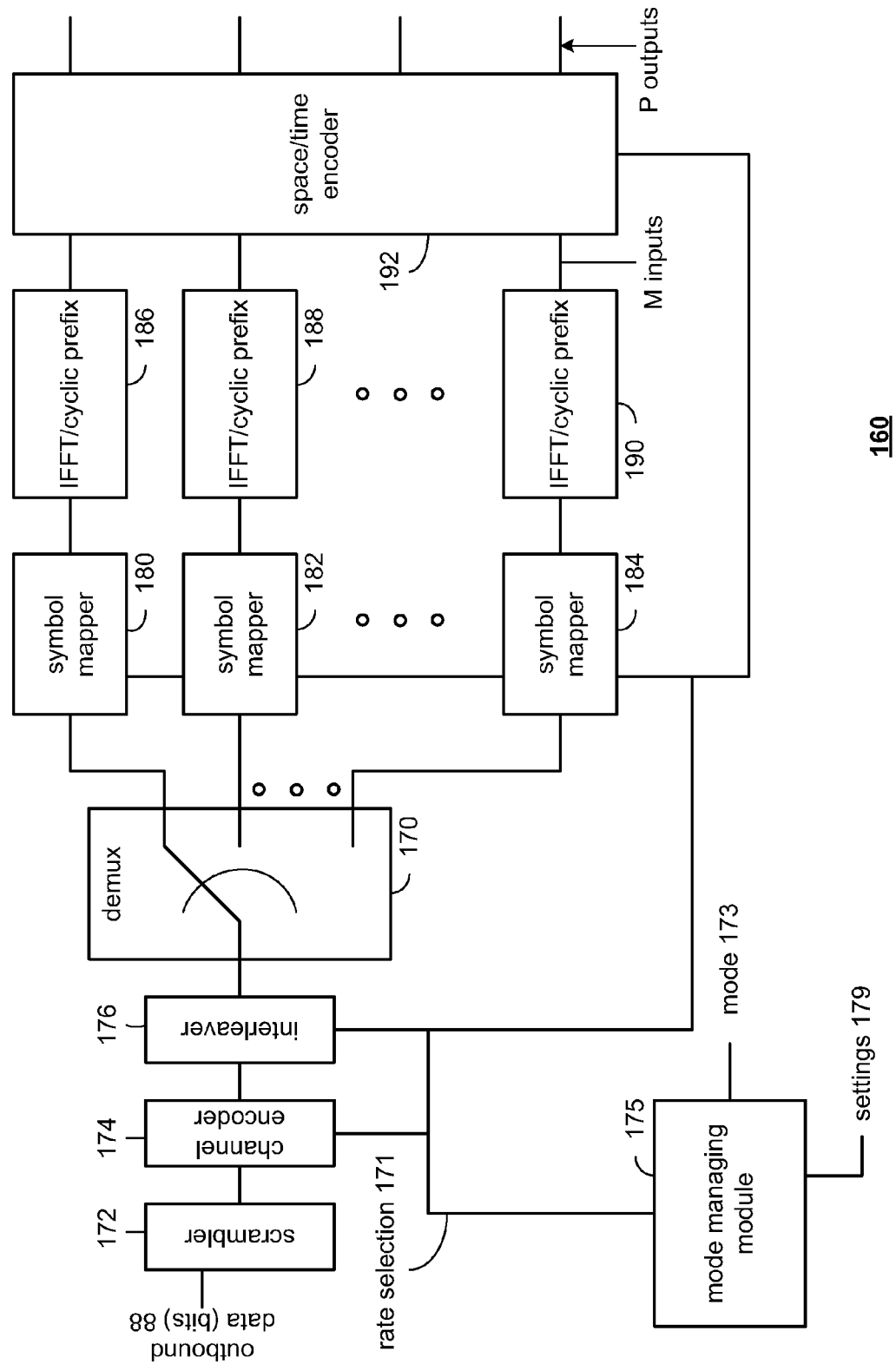
FIGS. 10A and 10B are diagrams illustrating embodiments of a radio transmitter.
Figure 10B:
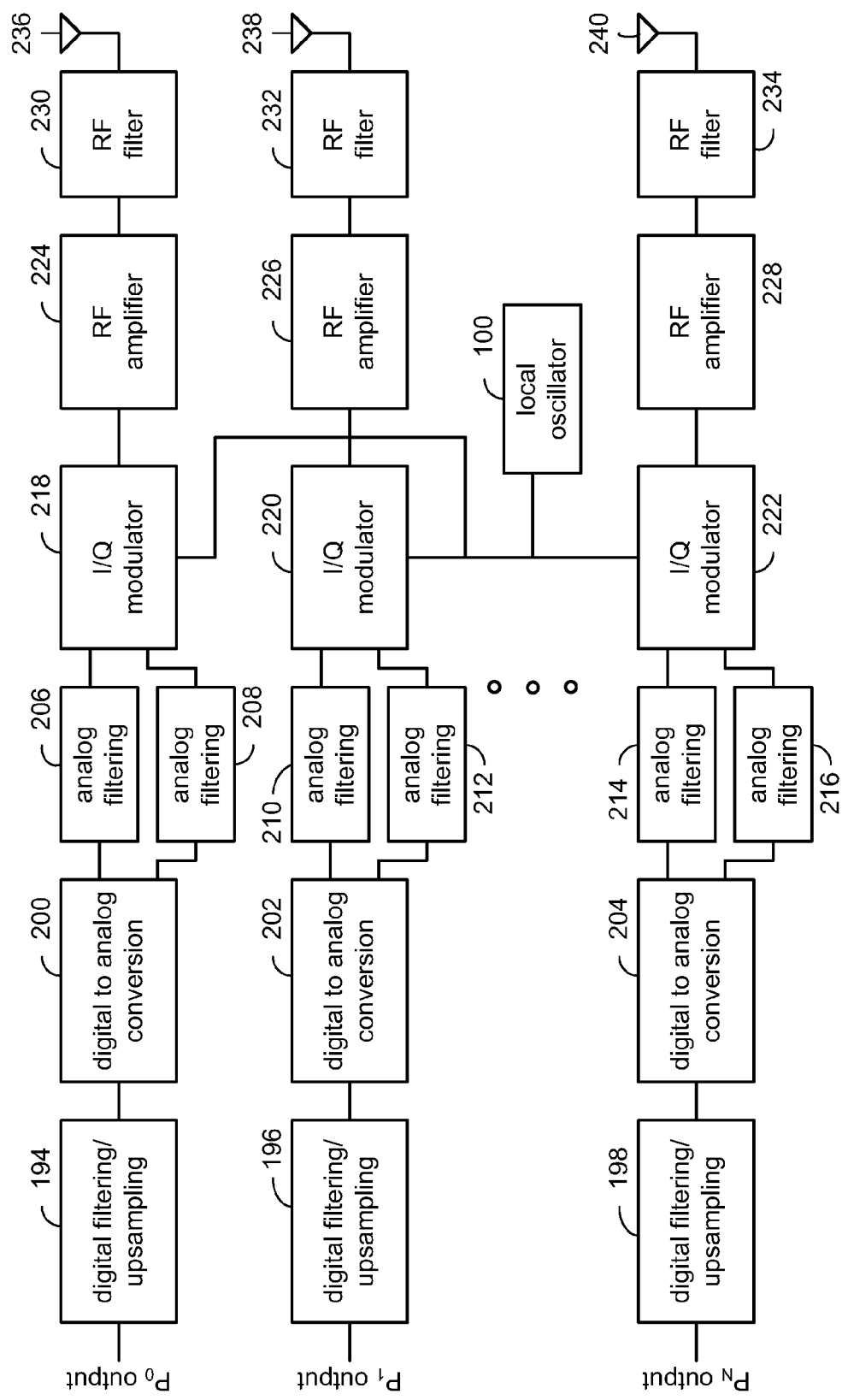

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of 1/2, 2/3, and 3/4 according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \cdots & C_{2M-1} & C_{2M} \\ -C_2^* & C_1^* & -C_4^* & C_3^* & \cdots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
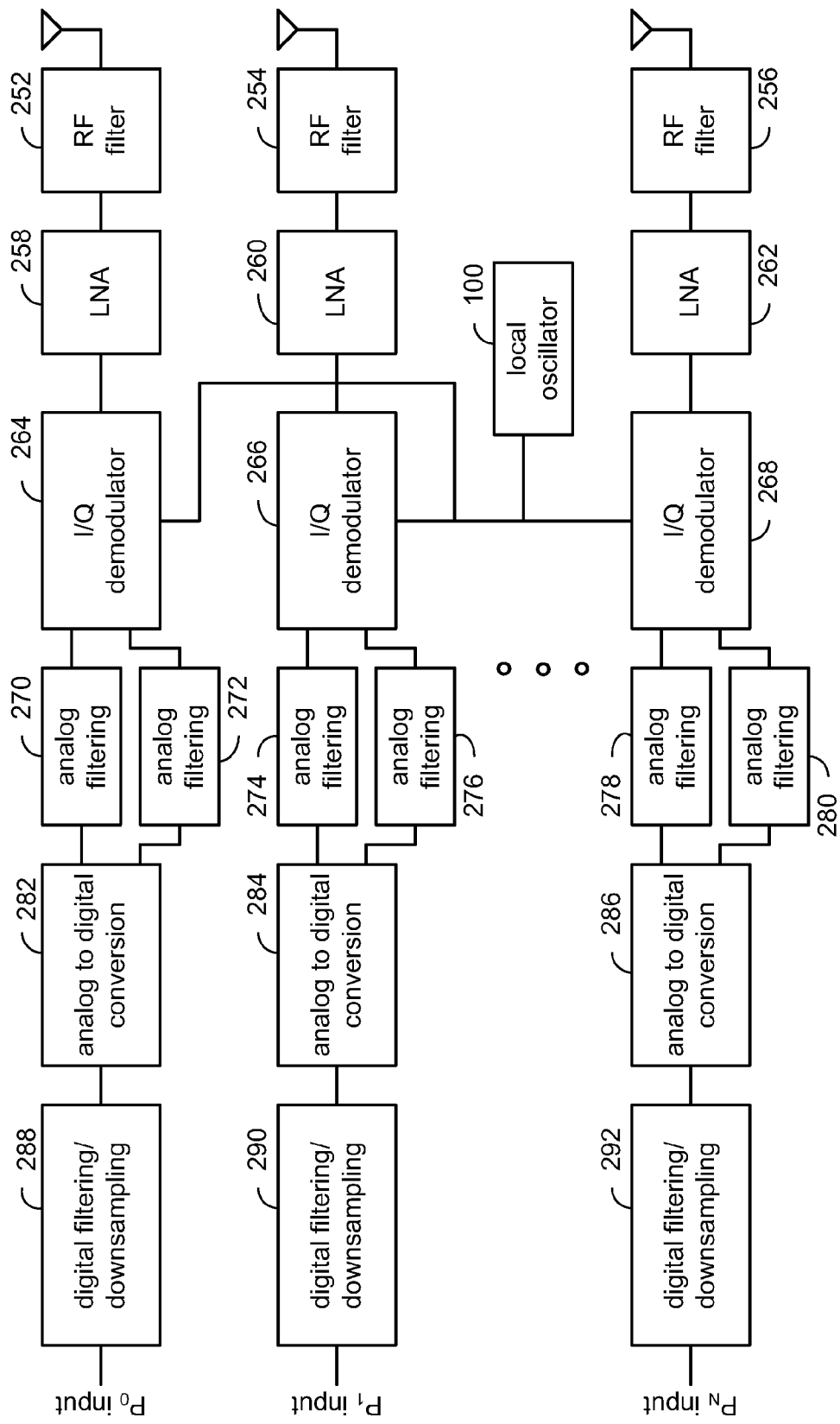
FIGS. 11A and 11B are diagrams illustrating embodiments of a radio receiver.
Figure 11B:
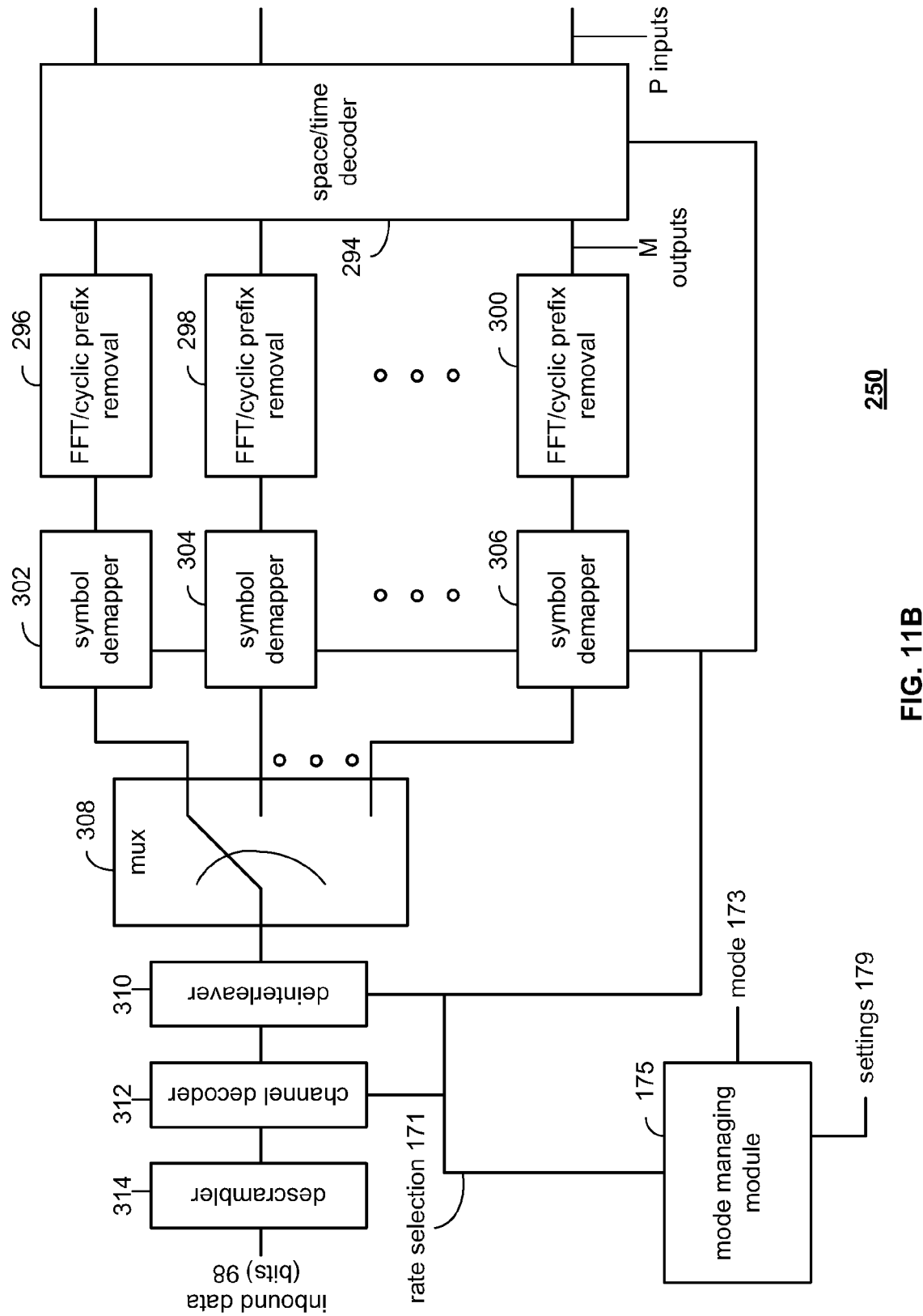

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
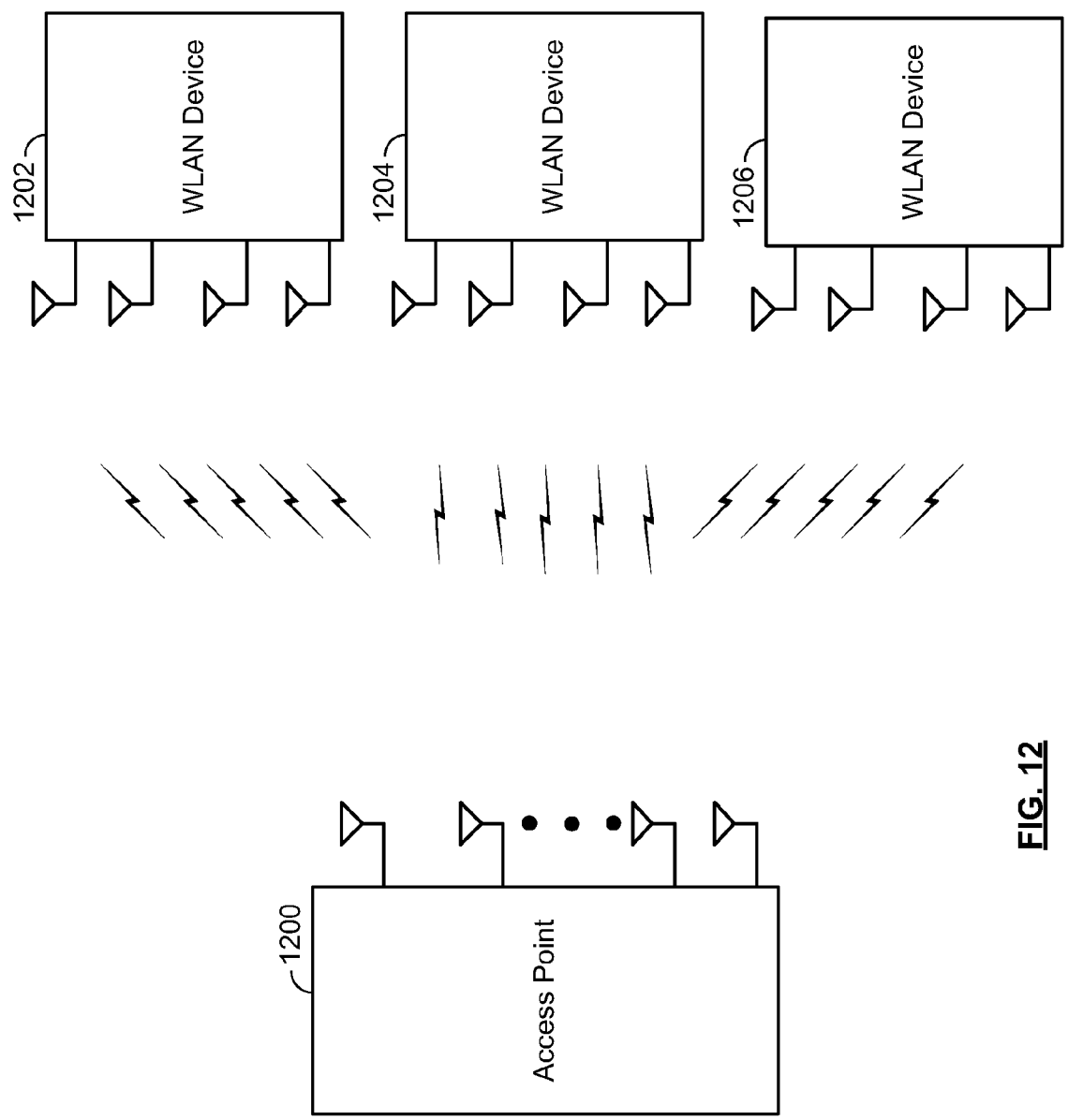
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may be compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. The clusters employed for such communications may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users (e.g., TGa and/or TGn, etc.) and new version users (e.g., TGac MU-MIMO, OFDMA, MU-MIMO/OFDMA, etc.) may share bandwidth at a given time or they can be scheduled at different times for certain embodiments. Moreover, a transmitting wireless communication device (e.g., such as a MU-MIMO, OFDMA, or combination OFDMA/MU-MIMO transmitter) may transmit multi-user packets to more than one receiving wireless communication devices (e.g., STAs) on a same cluster within a single aggregated multi-user packet (e.g., in accordance with in a time-multiplexed signaling). When operating in accordance with such a multi-user (MU) communication system, channel training (e.g., channel estimation, characterization, etc.) is typically performed with respect to the various communication channels/paths between the transmitting wireless communication device and each of the receiving wireless communication devices. Of course, when two or more receiving wireless communication devices are relatively located close to one another (e.g., within a particularly close or small region), channel training corresponding to one of those closely located wireless communication devices may be applied and used for other of those closely located wireless communication devices as well.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

It is noted that while certain of the embodiments described herein illustrate a wireless communication device pictorially as having one antenna, any of the various wireless communication devices in accordance with the various principles presented herein may include a plurality of antennae. Moreover, any of the various wireless communication devices in accordance with the various principles presented herein may include multiple receive and/or transmit chains for processing signals to be transmitted to and/or received from other wireless communication devices (e.g., such as with reference to FIG. 2). It is also noted that the number of antennae within a wireless communication device need to correspond exactly to the number of chains (receive and/or transmit) within that wireless communication device. For example, appropriate processing of signals received or to be transmitted by a plurality of antennae may be performed to process those signals using a number of chains (receive and/or transmit) that is different than the number of antennae within the wireless communication device.

Within such wireless communication systems as are described in various embodiments herein, certain wireless communication systems can include a transmitting wireless communication device (e.g., an access point (AP)) and one or more receiving wireless communication devices (e.g., wireless stations (STAs)). In other embodiments, all of the wireless communication devices therein are STAs, such that a transmitting wireless communication device therein is in fact a STA as are any such receiving wireless communication devices within such a wireless communication system. Moreover, it is noted that while reference is provided herein with respect to a transmitting wireless communication device and/ or a receiving wireless communication device; however, it is of course noted that such communications can indeed be bi-directional. Generally speaking, communications from the transmitting wireless communication device to a receiving wireless communication device is referred to as a downlink (DL) direction of communications, communications from the receiving wireless communication device to the transmitting wireless communication device is referred to as an uplink (UL) direction of communications.

With respect to such UL directions of communications (e.g., from one or more receiving wireless communication devices to a transmitting wireless communication device, such as from one or more STAs to an AP), certain considerations are made when operating within communication systems including multiple wireless communication devices. For example, with respect to multi-user UL communications, such communications can happen in any of a number of signaling dimensions or combination thereof including in accordance with a multi-user multiple input multiple output (MU-MIMO) signaling dimension and a frequency signaling dimension. With respect to the frequency signaling dimension, asynchronous frequency division multiplexing (FDM) or synchronous FDM are options by which such communications may be effectuated.

Figure 14:
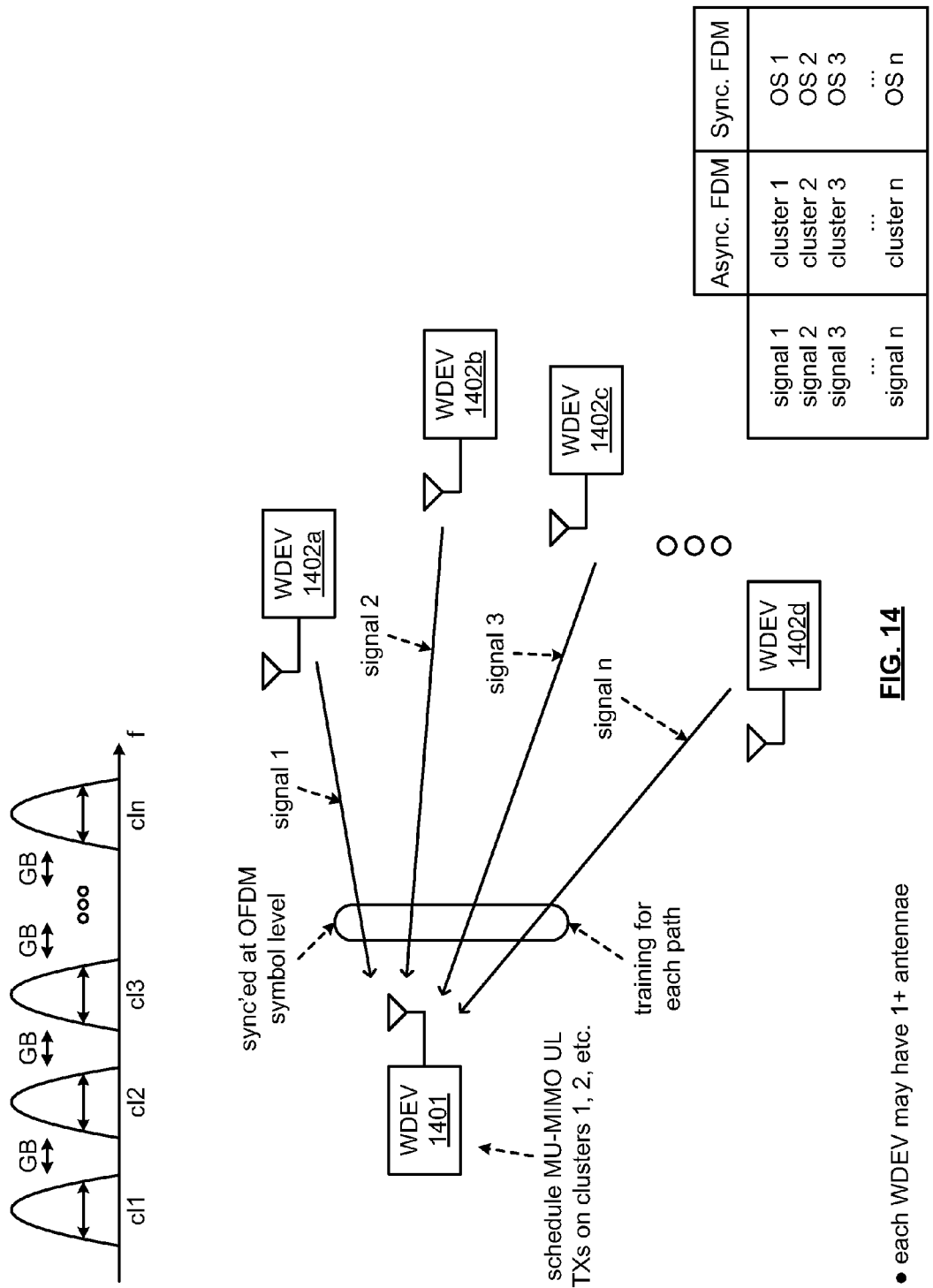
FIG. 14 is a diagram illustrating an embodiment of a wireless communication system in which asynchronous frequency division multiplexing (FDM) or synchronous FDM may be performed.

FIG. 14 is a diagram illustrating an embodiment of a wireless communication system in which asynchronous frequency division multiplexing (FDM) or synchronous FDM may be performed.

A wireless communication system may be viewed as including a number of wireless communication devices 1401 (generally depicted as being a transmitting wireless communication device) and wireless communication devices 1402*a*, 1402*b*, 1402*c*, and generally up to 1402*d* (generally depicted as being receiving wireless communication devices). Communications directed from the wireless communication devices 1402*a*-1402*d* to the wireless communication device 1401 are generally referred to as UL communications. In some embodiments, the transmitting wireless communication device 1401 is an AP, and the receiving wireless communication devices 1402*a*-1402*d* are STAs; in other embodiments, all of the wireless communication devices in the diagram are STAs.

When operating in accordance with asynchronous FDM signaling, multiple of the wireless communication devices 1402*a*-1402*d* are transmitting on different clusters with a sufficient guard band (GB) (or sometimes referred to as guard interval (GI)) there between (e.g., where the transmitted signals need not necessarily be orthogonal). At the top of the diagram, the various clusters are shown as being separated by respective GIs there between. While this diagram pictorially shows the clusters as being respective channels, it is of course noted that a cluster may be any combination of any one or more channel among one or more bands.

When the various wireless communication devices 1402*a*-1402*d* transmitting in the UL direction on different clusters (e.g., each of the wireless communication devices 1402*a*-1402*d* transmitting on a respective, different cluster), the transmitting wireless communication device 1401 (e.g., an AP) may perform appropriate filtering of such received signals to effectuate user separation and discrimination. In some embodiments, the transmitting wireless communication device 1401 may employ multiple, parallel frontends for performing such filtering.

When operating in accordance with synchronous FDM signaling, multiple of the wireless communication devices 1402*a*-1402*d* are transmitting in the UL direction in a manner such that the signals corresponding to and being from different of the wireless communication devices 1402*a*-1402*d* are mutually orthogonal or close to mutually orthogonal within some acceptable constraint (e.g., generally shown as orthogonal signal (OS) 1, OS 2, and up to OS n).

With respect to supporting such MU-MIMO UL communications, certain considerations such as time synchronization, frequency synchronization, and/or power control (including wireless communication device/user grouping) may be performed. In some embodiments operating using such power control, the signal received from different respective receiving wireless communication devices (e.g., STAs) at the transmitting wireless communication device (e.g., AP) may be orthogonal with respect to one another.

Figure 15:
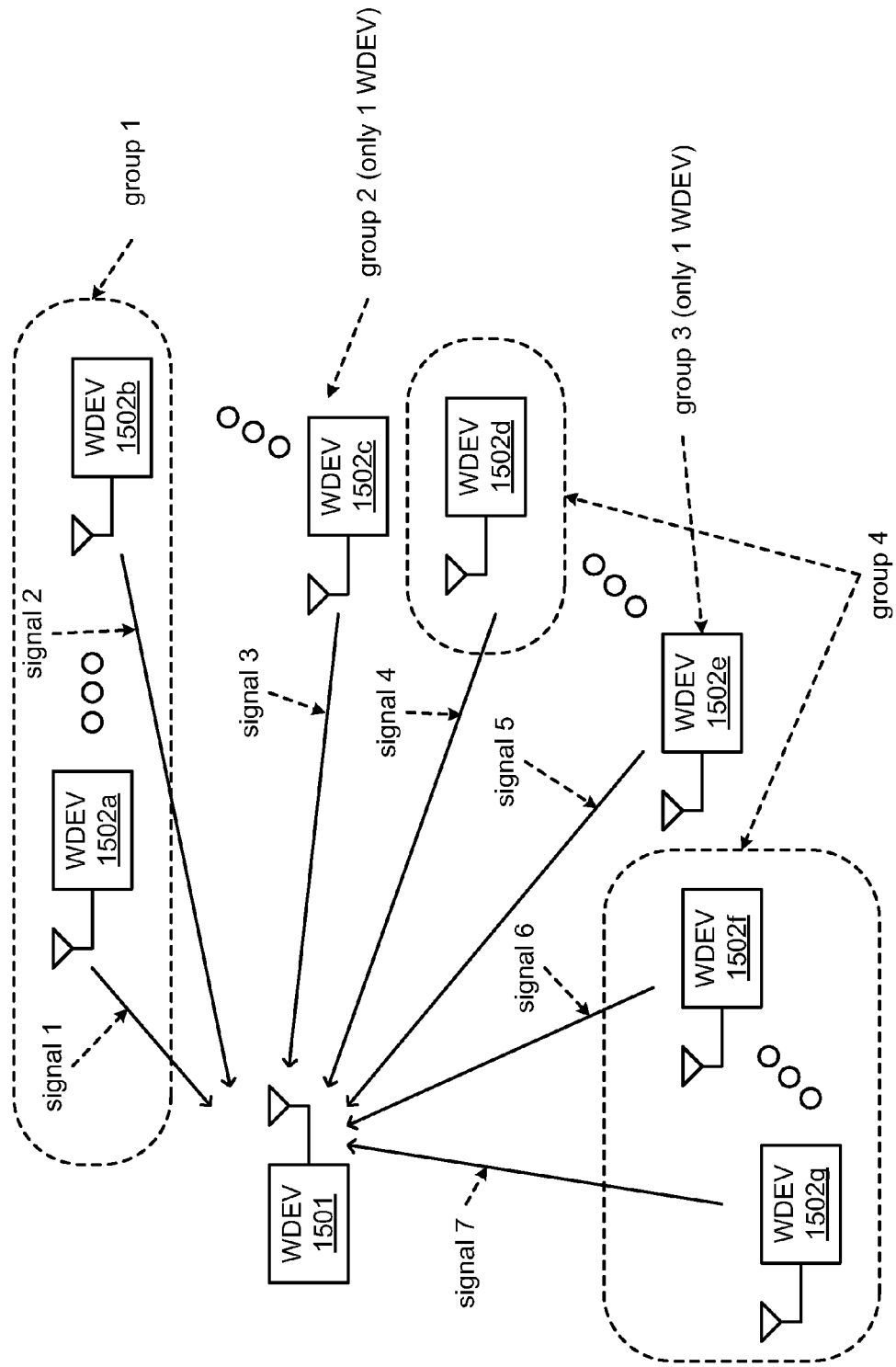

FIG. 15 is a diagram illustrating an embodiment of a wireless communication system in which various wireless communication devices are categorized into groups based on the power of signals received there from.

A wireless communication system may be viewed as including a number of wireless communication devices 1501 (generally depicted as being a transmitting wireless communication device) and wireless communication devices 1502*a*, 1502*b*, 1502*c*, and generally up to 1502*d* (generally depicted as being receiving wireless communication devices). Communications directed from the wireless communication devices 1502*a*-1502*d* to the wireless communication device 1501 are generally referred to as UL communications. In some embodiments, the transmitting wireless communication device 1501 is an AP, and the receiving wireless communication devices 1502*a*-1502*d* are STAs; in other embodiments, all of the wireless communication devices in the diagram are STAs.

As a function of the powers associated with the various signals received from the receiving wireless communication devices 1502*a*-1502*d*, these wireless communication devices may be partitioned into various groups.

For example, for those wireless communication devices whose corresponding signal levels are within a first range (e.g., between power 1 and power 2), the wireless communication devices 1502*a* through 1502*b* may be partitioned into a group 1. Those wireless communication devices whose corresponding signal levels are within a second range (e.g., between power 2 and power 3), the wireless communication device 1502*c* may be partitioned into a group 2 (including only a single wireless communication device in this embodiment). Those wireless communication devices whose corresponding signal levels are within a third range (e.g., between power 3 and power 4), the wireless communication device 1502*e* may be partitioned into a group 3 (also including only a single wireless communication device in this embodiment). Those wireless communication devices whose corresponding signal levels are within a third range (e.g., between power 4 and power 5), the communication devices 1502g through 1502f and 1502d may be partitioned into a group 4; as can be seen with respect to this group, all of the wireless communication devices within a particular group need not particularly be located in a common region.

With respect to at least two of the various types of FDM signaling that may be performed in accordance with the principles presented herein, different considerations may be made with respect to each. For example, with respect to UL asynchronous FDM signaling, power control with respect to the communications from the various receiving wireless communication devices is performed. With respect to UL synchronous FDM signaling, each of time synchronization, frequency synchronization, and power control/user grouping may be performed.

With respect to UL MU-MIMO communications, at least two independent case are considered: multi-packet reception (RX beamforming at the transmitting wireless communication device (e.g., AP), and UL transmit beamforming (beamforming on the receiving wireless communication devices (STAs)). The combination of multi-packet reception and UL transmit beamforming may be used.

With respect to the multi-packet reception (RX beamforming at the transmitting wireless communication device (e.g., AP)) case, multiple, simultaneous transmissions of signals in the UL direction (e.g., to an AP) may be performed on one or more clusters. Various synchronization mechanisms may be performed (e.g., such as with respect to time synchronization and/or frequency synchronization). Various power related issues are considered by the transmitting wireless communication device (e.g., the AP). Various types of training/sounding may be performed in the UL direction as may be performed in the DL direction within a wireless communication system operating in accordance with MU-MIMO.

With respect to the UL transmit beamforming (beamforming on the receiving wireless communication devices (STAs)) case, operation may be similar to the approach made with respect to the DL direction within a wireless communication system operating in accordance with MU-MIMO. However, with respect to training (e.g., channel estimation and characterization), operation including employing an individual sounding frame being transmitted by each receiving wireless communication device (e.g., STA) to the transmitting wireless communication device (e.g., AP). The transmitting wireless communication device (e.g., AP) may then transmit the beamforming (BF) feedback to the receiving wireless communication devices (e.g., STAs) individually.

With respect to communicating such BF feedback, the transmitting wireless communication device (e.g., AP) may aggregate the BF feedback and transmit the aggregated feedback to several receiving wireless communication devices (e.g., STAs) using one or more MU-MIMO/OFDMA transmissions. The transmitting wireless communication device (e.g., AP) may schedule such sounding frames in the UL communication direction (e.g., directing the various receiving wireless communication devices of when to transmit such sounding frames).

With respect to synchronizing communications in the UL direction within MU-MIMO wireless communication systems, all received UL packets at the transmitting wireless communication device (e.g., AP) are synchronized at the orthogonal frequency division multiplexing (OFDM) symbol level (e.g., as generally depicted at FIG. 14). For example, the OFDM symbol boundaries may have an offset up to Dmax (e.g., such as Dmax being determined by the AP). This offset among OFDM symbol boundaries, Dmax, may be calculated based on the length of a guard interval (GI) and a delay spread (DS) of the communication channel and path(s) via which the signals are passing. For example, if the time offset is less than this OFDM symbol boundary offset, Dmax, then such a communication signal (e.g., a MU-MIMO signal) can be recovered at the transmitting wireless communication device (e.g., AP).

A similar training/sounding approach may be employed with respect to DL MU-MIMO transmissions as may be used for receiver beamforming on the uplink for the respective receiving wireless communication devices (e.g., STAs). A transmitting wireless communication device (e.g., AP) may need to consider the received power from the different, respective receiving wireless communication devices (e.g., STAs) when it selects certain of the them for UL MU-MIMO transmissions (e.g., groups certain of the STAs such as with respect to FIG. 15).

The receiving wireless communication devices (e.g., STAs) may need to compensate for their carrier frequency offset (CFO) with respect to signals provided form the transmitting wireless communication device (e.g., AP). For example, STAi may employ CFOi (i.e., the CFO corresponding to STAi) to compensate for carrier offset with respect to STAi (e.g., by multiplying a signal to be transmitted by $e^{j(CFOi)t}$ thereby compensating for the CFO corresponding to that STA). The transmitting wireless communication device (e.g., AP) may also schedule synchronized UL MU-MIMO transmissions on different clusters.

As mentioned above, various types of synchronization (e.g., time synchronization and frequency synchronization) may be performed with respect to UL communications.

With respect to time synchronization, one or more of the following techniques may be employed with respect to MU-MIMO UL communications.

If all the receiving wireless communication devices (e.g., STAs) which may be part of an UL MU-MIMO communication have less than the Dmax relative offset, then the transmitting wireless communication device (e.g., AP) may schedule uplink MU-MIMO transmission using any combination of the receiving wireless communication devices (e.g., STAs).

If the receiving wireless communication devices have more than the Dmax delay spread, then the transmitting wireless communication device (e.g., AP) may form groups thereof such that the receiving wireless communication devices having less than the Dmax delay spread. The transmitting wireless communication device (e.g., AP) may schedule the uplink MU-MIMO communication for the receiving wireless communication devices (e.g., STAs) inside of a particular group.

If the relative offset among some stations is more than this value of Dmax, then the transmitting wireless communication device (e.g., AP) may use various mechanisms to ask the receiving wireless communication devices (e.g., STAs) to offset their respective UL traffic so that the packets there from arrives at the transmitting wireless communication device (e.g., AP) with no more than the Dmax relative offset.

The transmitting wireless communication device (e.g., AP) may decide to use such an offset mechanism even if the delay spread among the receiving wireless communication devices (e.g., STAs) in an uplink MU-MIMO transmission is less than Dmax.

An adjustable physical layer (PHY) format may be applied where a transmitting wireless communication device (e.g., AP) can change the Dmax relative offset (e.g., indirectly) based on the channel state information (CSI) feedback and/or the relative calculated or measured delay from the receiving wireless communication devices (e.g., STAs) which may be part of an uplink MU-MIMO communication. For example, if the GI for an UL MU-MIMO communication is set of be large enough, this may effectively lead to the embodiment in which all the receiving wireless communication devices (e.g., STAs) which may be part of an UL MU-MIMO communication have less than the Dmax relative offset, as described above.

Of course, any combination of one or more of these various means of operation may be performed without departing from the scope and spirit of the invention.

Also, if and when a transmitting wireless communication device (e.g., AP) determines it is necessary to apply such an "offset mechanism" in order to adjust the packet arrival time from various receiving wireless communication devices (e.g., STAs), a scheduled UL transmission may be performed.

Figure 16:
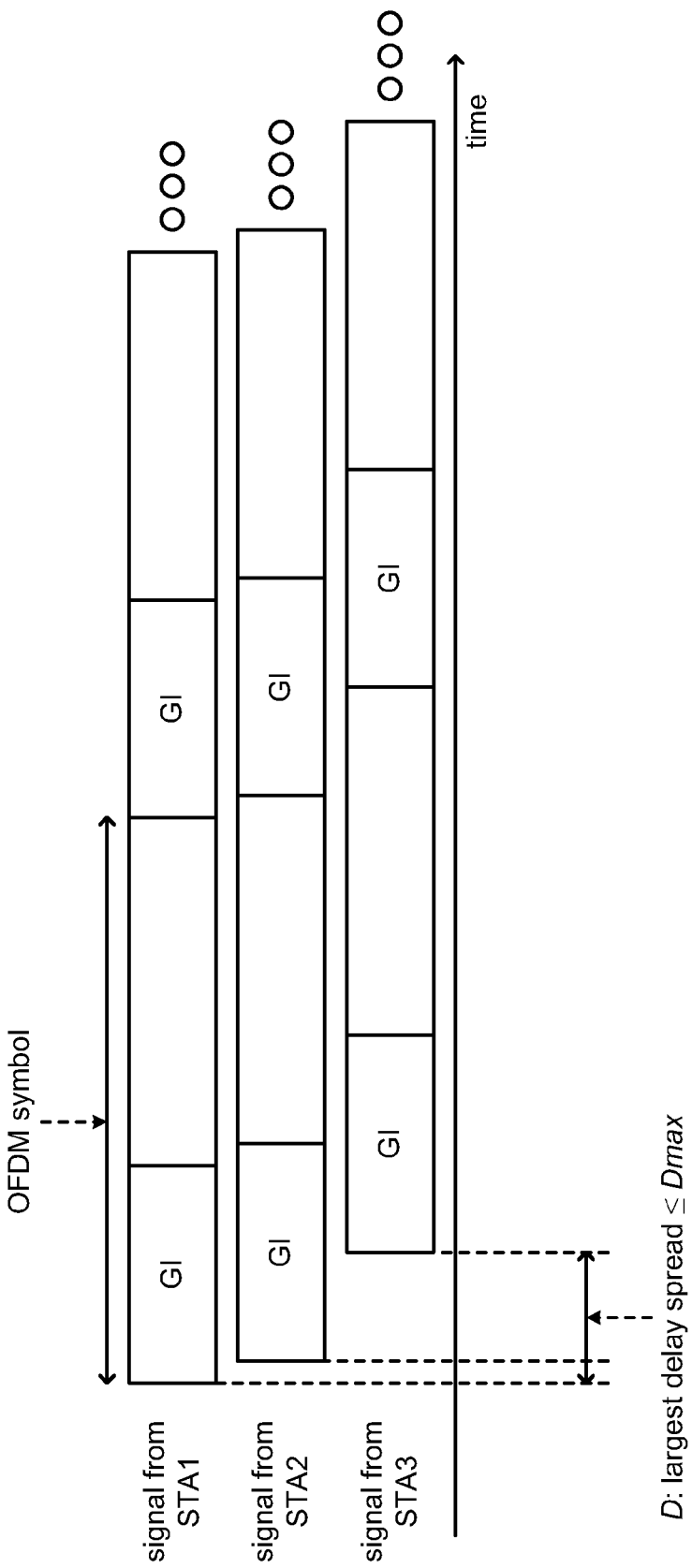
FIG. 16 is a diagram illustrating an embodiment of a multi-user multiple input multiple output (MU-MIMO) multi-packet reception.

FIG. 16 is a diagram illustrating an embodiment of a multi-user multiple input multiple output (MU-MIMO) multi-packet reception. A transmitting wireless communication device (e.g., AP) can recover the signal from various receiving wireless communication devices (e.g., STA1 to STA3) if the maximum offset among the OFDM symbol boundaries is less than the length of the guard interval, $T_{GI}$, minus the maximum delay spread of the communication paths for each of STA1 to STA3, $T_{ch}$. It is noted that the delay spread, $T_{ch}$, may be different for the different receiving wireless communication devices (e.g., STA1 to STA3). The largest delay spread among them, shown as D, is the one which determines the maximum offset value, Dmax.

The diagram depicts simultaneous packet arrival at the transmitting wireless communication device (e.g., AP) from the various receiving wireless communication devices (e.g., STA1 to STA3) on a particular cluster. When the delay spread, D, which is the maximum relative delay among the participating receiving wireless communication devices (e.g., STAs), is less than the maximum offset value, Dmax, an UL MU-MIMO communication may be made. In some embodiments, the maximum offset value, Dmax, is chosen by the transmitting wireless communication device (e.g., AP) (e.g., Dmax needs to be less than $T_{GI}-T_{ch}$).

With respect to performing such delat measurements with respect to such multi-packet communications, a transmitting wireless communication device (e.g., AP) may calculate the relative time shift between arrivals of the various packets from the different receiving wireless communication devices (e.g., STAs) (as may be scheduled for an UL MU-MIMO transmission) using time stamps on the packets. For example, the various receiving wireless communication devices (e.g., STAs) may add respective time stamps to some control or data packets provided to the transmitting wireless communication device (e.g., AP).

The time synchronization function (TSF) timer may be used as a basis for effectuating such time stamps. Generally, the TSF timer steps are a microsecond (1 µsec). In some cases, the TSF timer may not be sufficiently accurate to help ensure synchronization. If that it is case, a timer with finer resolution may be employed.

A transmitting wireless communication device (e.g., AP) may use mechanisms in TGv (IEEE 802.11v) instead of the mechanism used for TSF. For example, units of 10 nanoseconds (nsecs) may be sufficient to synchronize.

Alternatively, new clock and/or new synchronization mechanisms may be used based on the required resolution and accuracy. The resolution may be proportional to the length of the GI minus the longest delay spread difference among the participating receiving wireless communication devices (e.g., STAs) (e.g., maximum offset value, Dmax) for all the receiving wireless communication devices (e.g., STAs) which may be part of an uplink MU-MIMO communication.

A transmitting wireless communication device (e.g., AP) may use various response frames to calculate the delay spread among the receiving wireless communication devices (e.g., STAs) that may be scheduled for an uplink MU-MIMO transmission. For example, a transmitting wireless communication device (e.g., AP) may use the arrival time of the response frames to calculate the delay spread between different receiving wireless communication devices (e.g., STAs). For example, some examples of frame exchanges may be used to calculate the delay spread and to synchronize the receiving wireless communication devices (e.g., STAs): a polling mechanism, various request to send (RTS)/clear to send (CTS) exchanges, and acknowledgments (ACKs) as provided from such devices to which transmissions are made.

Figure 17:
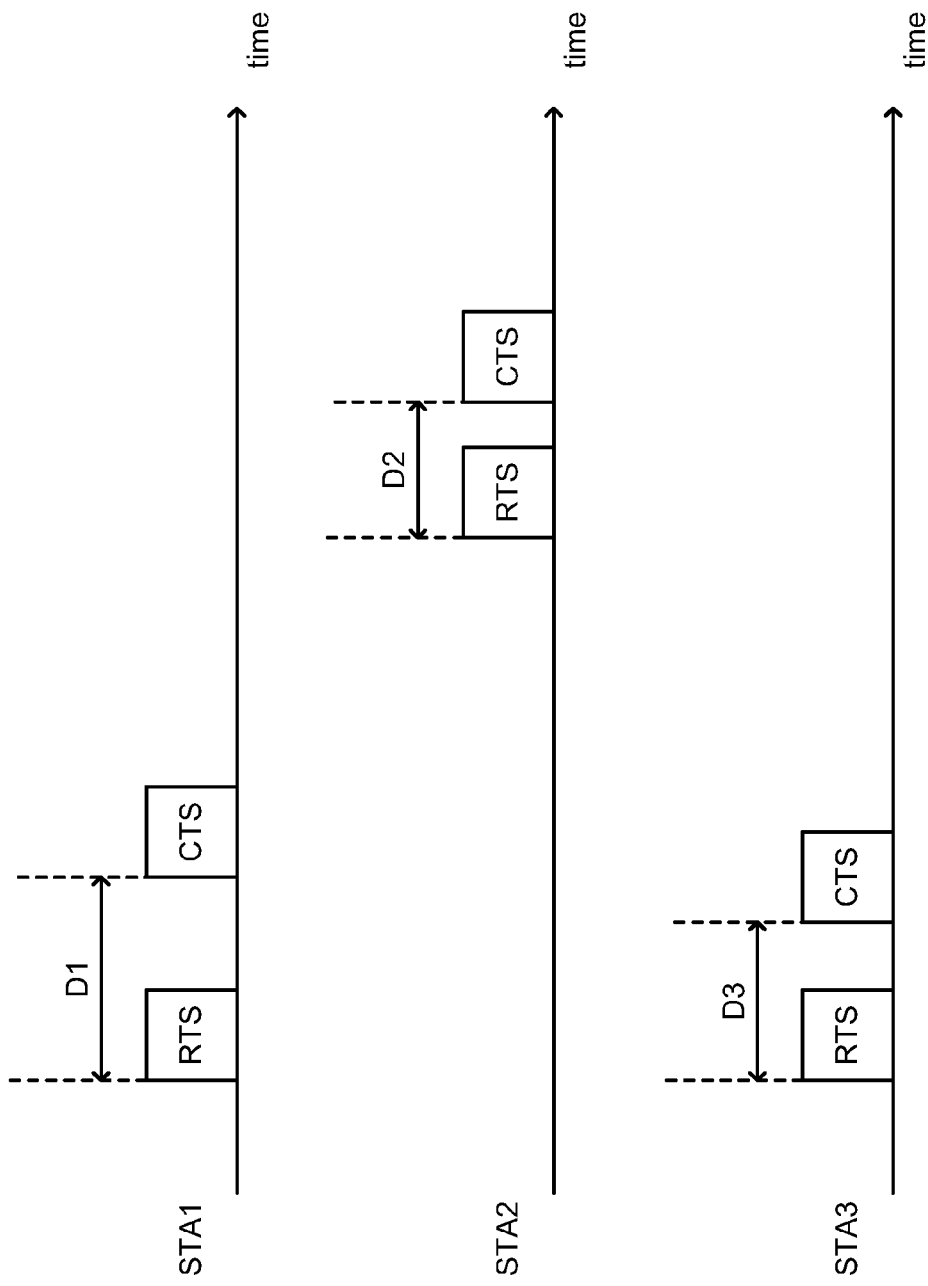
FIG. 17 is a diagram illustrating an embodiment of a calculating delay corresponding to various wireless communication devices using response frames, and in particular, using request to send (RTS)/clear to send (CTS) exchanges.

FIG. 17 is a diagram illustrating an embodiment of a calculating delay corresponding to various wireless communication devices using response frames, and in particular, using request to send (RTS)/clear to send (CTS) exchanges. This diagram shows respective RTSs being sent from various receiving wireless communication devices (e.g., STA1, STA2, and STA3). Within such a wireless communication system, difference between each of the delays (e.g., D1, D2 and D3) at which the CTS responses are received may be for a variety of different reasons (e.g., link delays, multi-path effects, processing delays, etc. are just some possible reasons for the delay variations).

In applying such an offset mechanism as used by a transmitting wireless communication device (e.g., AP) in accordance with multi-packet reception, the transmitting wireless communication device (e.g., AP) may calculate the various time offsets which may be used by the different receiving wireless communication devices (e.g., STAs) so that the maximum time offset between the respective OFDM symbol boundaries of UL received packets is less than the maximum offset value, Dmax.

A scheduled UL transmission (e.g., from the STAs to the AP) may be followed by the calculated offsets.

For example, the offset $O_i$ for STA i may have values between $-X*E$ and $X*E$ ($-X*E<O_i<X*E$) where X is a fractional number ($|X| \leq 1$) with k bits representation and E is a number to be determined by the transmitting wireless communication device (e.g., AP).

For example, this value of E may be found as being multiples of $T_{GI}/2$, such as $E=N \times T_{GI}/2$, where N is a positive integer (e.g., N=2).

The number of bits, k, may be determined by the transmitting wireless communication device (e.g., AP). The transmitting wireless communication device (e.g., AP) may use parameters such as guard interval (GI) length and channel delay spread (DS) to determine number of bits, k.

Figure 18:
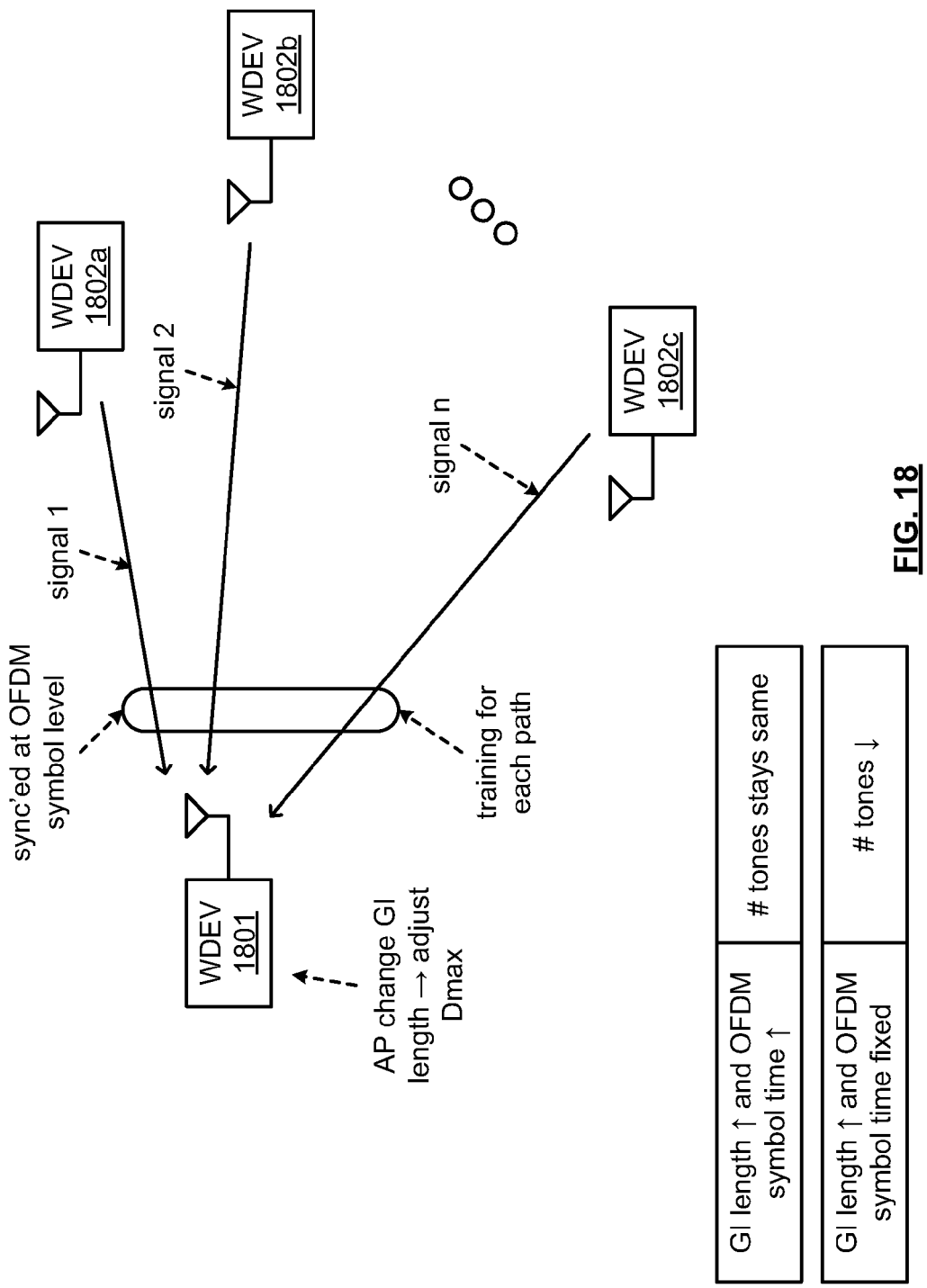
FIG. 18 is a diagram illustrating an embodiment of adjusting guard interval (GI) in accordance with multi-user (MU) uplink communications.

FIG. 18 is a diagram illustrating an embodiment of adjusting guard interval (GI) in accordance with multi-user (MU) uplink communications.

A wireless communication system may be viewed as including a number of wireless communication devices 1801 (generally depicted as being a transmitting wireless communication device) and wireless communication devices 1802a, 1802b, and generally up to 1802c (generally depicted as being receiving wireless communication devices). Communications directed from the wireless communication devices 1802a-1802c to the wireless communication device 1801 are generally referred to as UL communications. In some embodiments, the transmitting wireless communication device 1801 is an AP, and the receiving wireless communication devices 1802a-1802c are STAs; in other embodiments, all of the wireless communication devices in the diagram are STAs.

Adjustable the GI is one means by which the maximum offset value, Dmax, may be changed indirectly. For example, the transmitting wireless communication device (e.g., AP) may change the length of the GI to adjust the maximum offset value, Dmax. A long GI may be defined which can be used for UL MU-MIMO communications. The GI length can be modified dynamically through centralized control (e.g., by the AP). A longer GI than defined in IEEE 802.11n specification may be employed to ensure in accordance with adjusting the maximum offset value, Dmax.

Alternatively, the receiving wireless communication devices (e.g., STAs) may rely on a long GI and may not need to use any such offset mechanism as described herein. This manner of adjusting the GI to effectuate an adjustment of the maximum offset value, Dmax, can provide for more simplified media access control (MAC) signaling and may decrease bandwidth efficiency (e.g., number of bits per unit of bandwidth).

As depicted in the diagram, the GI length may be adjusted upwards with the OFDM symbol time being increased (e.g., data portion+guard interval increases) in an embodiment where the number of tones is fixed.

An alternative embodiment may involve decreasing the number of tones as the length of the GI is increased, then the OFDM symbol time being fixed (e.g., data portion+guard interval fixed/constant) such that the OFDM symbol rate is fixed.

Figure 19:
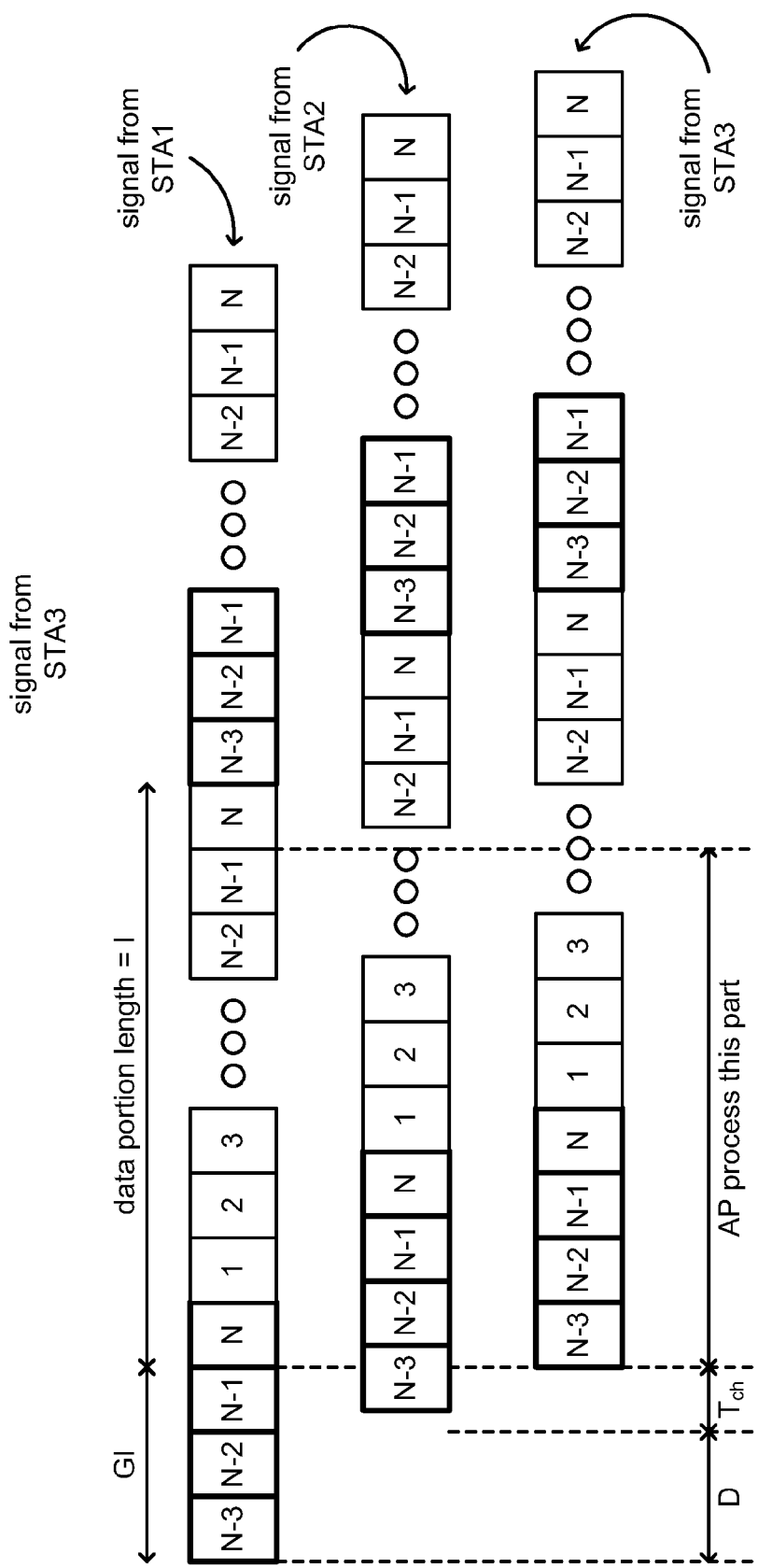
FIG. 19 is a diagram illustrating an embodiment of performing data sample alignment in accordance with MU uplink communications.

FIG. 19 is a diagram illustrating an embodiment of performing data sample alignment in accordance with MU uplink communications. If the data sample boundaries are aligned, then the transmitting wireless communication device (e.g., AP) may use one front-end and apply cyclic shift over the received OFDM symbols to undo the delay spread and differences. Such an implementation may work for both UL MU-MIMO and UL FDM communications.

Aligning the data sample boundaries may be particularly required for UL MU-MIMO communications. It may be possible for the transmitting wireless communication device (e.g., AP) to apply a cyclic rotation on the received signal and compensate for the data sample misalignment if the phase different between the receiving wireless communication devices (e.g., STAs) is known at the transmitting wireless communication device (e.g., AP).

Aligning data sample boundaries may not be necessary for UL FDM. For example, if the data sample boundaries are not aligned for UL FDM, then parallel front-ends within the transmitting wireless communication device (e.g., AP) may be used to recover the signal.

Figure 20:
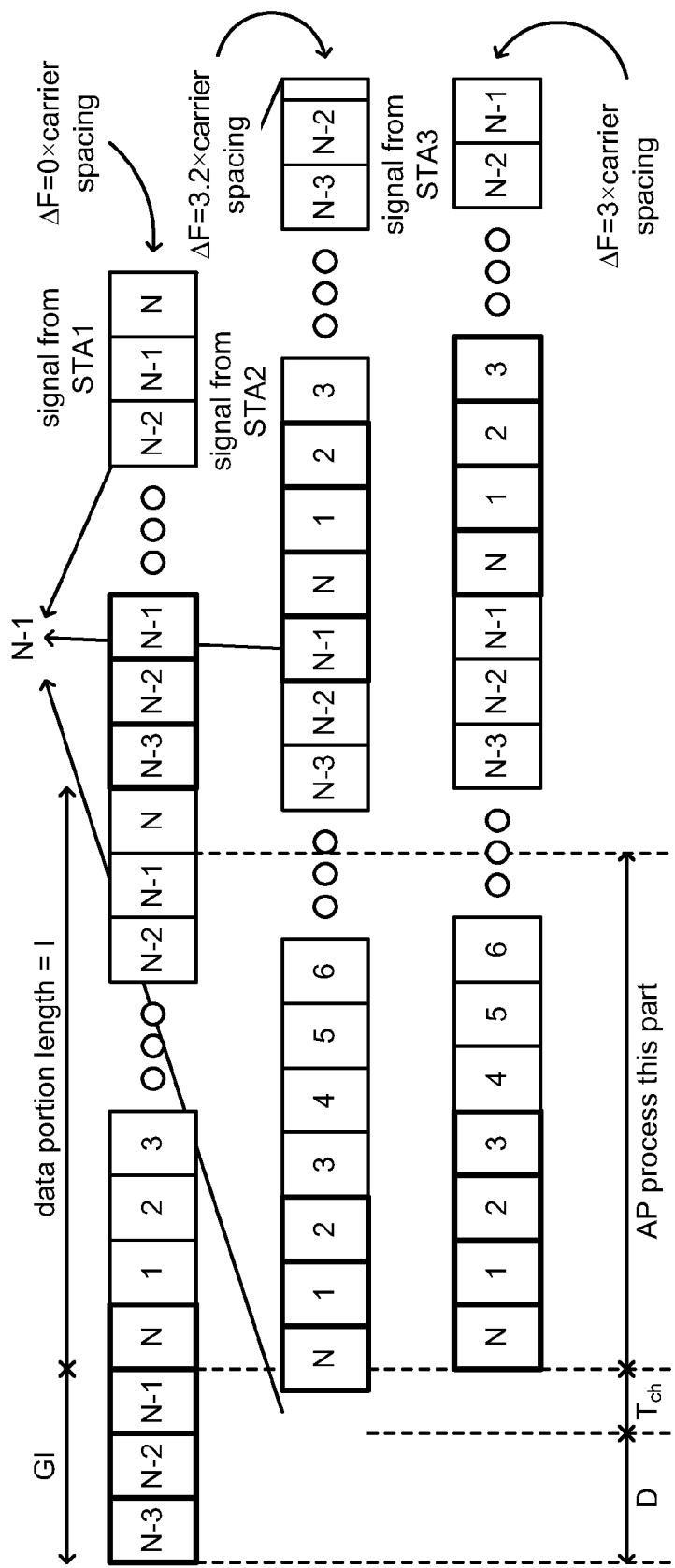
FIG. 20 is a diagram illustrating an embodiment of performing cyclic shifting on orthogonal frequency division multiplexing (OFDM) symbols (using frequency shift) in accordance with MU uplink communications.

FIG. 20 is a diagram illustrating an embodiment of performing cyclic shifting on orthogonal frequency division multiplexing (OFDM) symbols (using frequency shift) in accordance with MU uplink communications.

A receiving wireless communication device (e.g., STA) may apply such a frequency shift before performing an inverse discrete Fourier transform (IDFT) on a baseband signal (e.g., as may be performed within a baseband processing module) to align the received data samples on the transmitting wireless communication device (e.g., AP) (Base_band_signal$\times e^{j\Delta Ft}$). The frequency shift on the baseband signal results in a cyclic shift in the OFDM symbols.

The applied frequency shift before the IDFT may be divided into two parts: an integer part of the carrier spacing ($\Delta F_{int}$) and fractional part of carrier spacing ($\Delta F_{frac}$) ($\Delta F = \Delta F_{int} \times$ carrier_spacing + $\Delta F_{frac}$). The value $\Delta F_{frac}$ may be used to adjust the data sample boundaries. The value $\Delta F_{int}$ may be used to adjust data sample indices. In some cases, the fractional sample adjustment may occur at the receiving wireless communication device (e.g., STA) to align the data sample boundaries and the integer sample adjustment may occur at the transmitting wireless communication device (e.g., AP) side after the fast Fourier transform (FFT).

A transmitting wireless communication device (e.g., AP) may calculate $\Delta F_{int}$ and/or $\Delta F_{frac}$ and transmit it to a receiving wireless communication device (e.g., STA). the values $\Delta F_{int}$ and/or $\Delta F_{frac}$ may be transmitted using a separate management frame to the receiving wireless communication devices (e.g., STAs); alternatively, or in conjunction, the values $\Delta F_{int}$ and/or $\Delta F_{frac}$ may be combined with the delay adjustment information $\Delta F_{int}$ and/or $\Delta F_{frac}$ may be combined with the carrier offset information (described later) and transmitted to the receiving wireless communication devices (e.g., STAs). The values $\Delta F_{int}$ and/or $\Delta F_{frac}$ may be combined with downlink data and transmitted to the receiving wireless communication devices (e.g., STAs).

In another embodiment, the cyclic rotation can be done at the transmitting wireless communication device (e.g., AP) side. In even other embodiments, a portion of the cyclic rotation can be done at the transmitting wireless communication device (e.g., AP) side and a portion of the cyclic rotation can be done at the receiving wireless communication device (e.g., STA) side.

As depicted in the diagram, a transmitting wireless communication device (e.g., AP) is requesting that one of the receiving wireless communication devices (e.g., STA2) may be applied to 3.2×carrier_spacing shift and another of the receiving wireless communication devices (e.g., STA3) may be applied to 3×carrier_spacing shift.

As mentioned above, power control and/or user grouping may be performed and appropriate for various embodiments including with respect to UL asynchronous FDM signaling and also with respect to UL synchronous FDM signaling.

The signal powers corresponding to the differences between the various receiving wireless communication devices (e.g., STAs) may need to be limited for the transmitting wireless communication device (e.g., AP) to receive the packets successfully there from; as such, power control and/or user grouping may be employed to effectuate such operation.

If $Pr_i$ is the received power from the receiving wireless communication device (e.g., STA i), a transmitting wireless communication device (e.g., AP) may receive all packet successfully if $(\max(Pr_i) - \min(Pr_i)) < PDmax$ for all i. In some instances, PDmax may be determined by the transmitting wireless communication device (e.g., AP). this value PDmax may be calculated based on the capabilities of the frontend of the transmitting wireless communication device (e.g., AP) (such as the dynamic range of an analog to digital converter (ADC) therein).

If the power difference between the received packets is higher than PDmax, then the transmitting wireless communication device (e.g., AP) may not be able to receive some of the packets properly.

The following mechanisms may be used to manage received power (of the signals received from the receiving wireless communication devices (e.g., STAs)) to be in the desired dynamic range of the transmitting wireless communication device (e.g., AP).

Those receiving wireless communication devices (e.g., STAs) with similar received power can be pooled together for uplink transmissions (e.g., such as with respect to FIG. 15). In such instances, no power control may be required to effectuate adequate or acceptable performance. As the number of receiving wireless communication devices (e.g., STAs) continues to increase, then grouping or pooling may become more desirable.

Power control managed by a transmitting wireless communication device (e.g., AP) may be used to adjust the power of receiving wireless communication devices (e.g., STAs) which are part of a MU-MIMO transmission if $(\max(Pr_i)-\min(Pr_i))>PD\max$ (e.g., explicit messaging to modify the transmit power sent to some of the receiving wireless communication devices (e.g., STAs). Also, power adjustment may be done as a part of the association of a particular receiving wireless communication device (e.g., STA).

In an even other embodiment, receiving wireless communication devices (e.g., STAs) with similar receive power ($\max(Pr_i)-\min(Pr_i)<PD\max$) may be pooled together where power control may be used for finer power adjustments inside the group.

Of course, any such combination of any two or more of the approaches presented above may be used without departing from the scope and spirit of the invention.

FIG. 21A and FIG. 21B are diagrams illustrating embodiments of a wireless communication system in which carrier frequency offset (CFO) compensation is performed to effectuate frequency synchronization.

A wireless communication system may be viewed as including a number of wireless communication devices 2101 (generally depicted as being a transmitting wireless communication device) and wireless communication devices 2102a, 2102b, and generally up to 2102c (generally depicted as being receiving wireless communication devices). Communications directed from the wireless communication devices 2102a-2102c to the wireless communication device 2101 are generally referred to as UL communications. In some embodiments, the transmitting wireless communication device 2101 is an AP, and the receiving wireless communication devices 2102a-2102c are STAs; in other embodiments, all of the wireless communication devices in the diagram are STAs.

With respect to frequency synchronization in accordance with MU UL communications, a transmitting wireless communication device (e.g., AP) may measure the carrier frequency offset between itself and each of the respective receiving wireless communication devices (e.g., the $STA_i$ ($CFO_i$)) using data packets and/or specially designed management/control frame). Various means of estimating the CFO associated with the various signals may be used including employing the long training fields (LTFs) and short training fields (STFs). After calculating such CFOs, the transmitting wireless communication device (e.g., AP) may sends the various values of the estimated $CFO_i$ back to the receiving wireless communication devices (e.g., all the $STA_i$). The estimated CFOs may be transmitted from the transmitting wireless communication device (e.g., AP) to the one or more receiving wireless communication devices (e.g., STAs) using a specially designed management frame or it may be aggregated with data and/or management/control frames. Each respective receiving wireless communication device (e.g., STAi) may use its corresponding and received $CFO_i$ to compensate for its respective carrier offset with respect to the transmitting wireless communication device (e.g., AP) when transmitting as part of a MU-MIMO uplink transmission.

In one embodiment, at least one antenna within the wireless communication device 2101 (e.g., a transmitting wireless communication device) operates by receiving a first multi-user packet including first signals therein such that each one of the first signals being from a respective one of the receiving wireless communication devices 2102a-2102c (e.g., STAs).

A baseband processing module within the transmitting wireless communication device 2101 may operate by calculating various CFOs such that each one of the CFOs corresponds to a respective one of the first signals (e.g., being respectively from the various receiving wireless communication devices 2102a-2102c (e.g., STAs).

The same one or more antennae (or different one or more antennae) within the wireless communication device 2101 (e.g., a transmitting wireless communication device) operates by transmitting a second multi-user packet to the receiving wireless communication devices 2102a-2102c (e.g., STAs). This second multi-user packet included the CFOs for use in synchronizing frequencies of second signals such as may be included within a third multi-user packet. The various multi-user packets described in this and other embodiments herein may be of various types including multiple input multiple output (MU-MIMO) packets, orthogonal frequency division multiple access (OFDMA) packets, or combination MU-MIMO/OFDMA packets.

The receiving wireless communication devices 2102a-2102c (e.g., STAs) receive the multi-user packet from the wireless communication device 2101 (e.g., a transmitting wireless communication device), that includes the CFOs, such that each of the receiving wireless communication devices 2102a-2102c (e.g., STAs) may employ a respective one of the CFOs for generating a respective signal being CFO-compensated. These CFO-compensated signals may then be transmitted from the receiving wireless communication devices 2102a-2102c (e.g., STAs) to the wireless communication device 2101 (e.g., a transmitting wireless communication device).

The manner in which the CFOs may be provided from the wireless communication device 2101 (e.g., a transmitting wireless communication device) to the receiving wireless communication devices 2102a-2102c (e.g., STAs) may be varied. For example, a baseband processing module within the wireless communication device 2101 (e.g., a transmitting wireless communication device) may operate by aggregating data intended for at least one of the receiving wireless communication devices 2102a-2102c (e.g., STAs) thereby generating such a multi-user packet to be transmitted to the receiving wireless communication devices 2102a-2102c (e.g., STAs). Alternatively, a baseband processing module within the wireless communication device 2101 (e.g., a transmitting wireless communication device) may operate by combining a management frame corresponding to at least one of the receiving wireless communication devices 2102a-2102c (e.g., STAs) thereby generating such a multi-user packet to be transmitted to the receiving wireless communication devices 2102a-2102c (e.g., STAs).

As also mentioned elsewhere herein, signals from the various receiving wireless communication devices 2102a-2102c (e.g., STAs) may be transmitted via different respective clusters. The wireless communication device 2101 (e.g., a transmitting wireless communication device) may receive such signals from the receiving wireless communication devices 2102a-2102c (e.g., STAs) via different antenna as well.

In some embodiments, medium access (e.g., access to the air for effectuating communications) is a triggering event that precipitates the receiving wireless communication devices 2102a-2102c (e.g., STAs) to send signals to the wireless communication device 2101 (e.g., a transmitting wireless communication device). For example, after the wireless communication device 2101 (e.g., a transmitting wireless communication device) gains medium access, the wireless communication device 2101 (e.g., a transmitting wireless communication device) may send a management frame to the receiving wireless communication devices 2102a-2102c (e.g., STAs) to indicate that they may begin transmission of respective signals of the wireless communication device 2101 (e.g., a transmitting wireless communication device).

In addition, a baseband processing module within the transmitting wireless communication device 2101 may operate by determining a time period during which the receiving wireless communication devices 2102a-2102c (e.g., STAs) may transmit to the transmitting wireless communication device 2101.

With respect to synchronous FDM signaling for such UL communications (e.g., from receiving wireless communication devices 2102a-2102c (e.g., STAs) to the transmitting wireless communication device 2101), time synchronization and frequency synchronization is performed. The various aspects and means for performing timing synchronization, delay adjustment, and adjustable guard interval as presented herein may be used for uplink synchronous FDM signaling.

If power control/power management is performed, the transmitting wireless communication device 2101 may be able to process the uplink traffic using one receive path. The various aspects and means for performing power control and/or management as presented herein may also be used for uplink synchronous FDM signaling.

With respect to asynchronous FDM signaling for such UL communications (e.g., from receiving wireless communication devices 2102a-2102c (e.g., STAs) to the transmitting wireless communication device 2101), timing and carrier offset synchronization may not be required. In such instances, the transmitting wireless communication device 2101 may need parallel receive paths (front-ends) for receiving signals coming from different receiving wireless communication devices 2102a-2102c (e.g., STAs).

If same low noise amplifiers (LNAs) and/or ADCs are used for different frequency bands on the transmitting wireless communication device 2101, then various aspects and means for performing power control and/or management as presented herein may also be applied. If independent gains and/or ADC is used over different portions of the cluster or band, power control and/or management may not be required.

With respect to gaining medium access as related to UL MU communications, once access to the medium is gained by a transmitting wireless communication device (e.g., AP), then the receiving wireless communication devices (e.g., STAs) may start transmitting the uplink traffic. The transmitting wireless communication device (e.g., AP) may transmit a management frame when medium access is gained indicating the start of multi user uplink transmission.

In case of uplink MU-MIMO and synchronous FDM signaling, the relative time offsets, $O_i$ (such as may be determined by a transmitting wireless communication device (e.g., AP)), may be transmitted to the receiving wireless communication devices (e.g., STAs). The transmitting wireless communication device (e.g., AP) may transmit the relative time offset to STAs scheduled for uplink transmission combined with the management frame indicating the start of uplink multi user transmission. Alternatively, a separate management frame may be used to transmit the time offsets. A transmitting wireless communication device (e.g., AP) may aggregate the relative time offsets with downlink data traffic and/or other management frame and/or control frames.

In case of uplink MU-MIMO and synchronous FDM signaling, a transmitting wireless communication device (e.g., AP) may send the estimated carrier offset ($CFO_i$) to the receiving wireless communication devices (e.g., STAs). For example, a transmitting wireless communication device (e.g., AP) may transmit the estimate carrier offsets to the receiving wireless communication devices (e.g., STAs) scheduled for uplink transmission combined with the management frame indicating the start of an UL MU transmission. Any of the alternative embodiments described herein such as with respect to frequency synchronization may be used to transmit $CFO_i$ to the receiving wireless communication devices.

Various examples for a transmitting wireless communication device (e.g., AP) for gaining medium access may be performed such as: carrier sense multiple access (CSMA), omni-directional CTS2SELF (such as transmitted by a transmitting wireless communication device (e.g., AP) for network allocation vector (NAV) distribution), employing a multi-user super-frame (MU-SF), employing RTS/CTS exchange mechanisms, etc.

Also, as mentioned elsewhere, the UL transmission time may be limited as governed by a transmitting wireless communication device (e.g., AP). In the case of an uplink MU-MIMO and synchronous FDM signaling, where timing and carrier synchronization is required, the maximum time for an uplink MU-MIMO transmission may be determined by a transmitting wireless communication device (e.g., AP) based on the capabilities of the transmitting wireless communication device (e.g., AP) and/or receiving wireless communication devices (e.g., STAs). For example, the accuracy of the oscillators used on the STAs and AP may be used to calculate the maximum uplink transmission time. The maximum time may be signaled in specific management frames either globally or to individual the receiving wireless communication devices (e.g., STAs). The maximum time may be aggregated with other data and/or management frame and/or control frames that are transmitted from the transmitting wireless communication device (e.g., AP) to the receiving wireless communication devices (e.g., STAs).

FIG. 22A, FIG. 22B, FIG. 23A, FIG. 23B, FIG. 24A, FIG. 24B, FIG. 25A, FIG. 25B, and FIG. 25C are diagrams illustrating various embodiments of methods for operating one or more wireless communication devices.

It is also noted that the various operations and functions as described with respect to various methods herein may be performed within a wireless communication device, such as using a baseband processing module implemented therein, (e.g., such as in accordance with the baseband processing module as described with reference to FIG. 2). For example, such a baseband processing module can perform processing of various signals including estimating CFOs corresponding to various signals, compensating for any one of the CFOs, selecting and grouping wireless communication devices as a function of various parameters (e.g., power consumption, etc.), performing data alignments (e.g., with respect to cyclic shifting), calculating delay using any of a variety of response frames (e.g., RTS/CTS exchanges), or any other operations and functions as described herein, etc. or their respective equivalents.

Referring to method 2200 of FIG. 22A, the method 2200 describes operations as may be performed within a transmitting wireless communication device. The method 2200 begins by employing at least one antenna of a wireless communication device for receiving a first multi-user packet from wireless communication devices. The first multi-user packet may be viewed as including first signals such that each one of the first signals being from a respective one of the wireless communication devices, as shown in a block 2210.

The method 2200 continues by calculating carrier frequency offsets (CFOs), based on the first signals, such that each one of the CFOs corresponding to a respective one of the first signals, as shown in a block 2220. The method 2200 then operates by transmitting a second multi-user packet to the wireless communication devices, as shown in a block 2230.

The second multi-user packet can include the CFOs for use in synchronizing frequencies of second signals within a third multi-user packet, as shown in a block 2230a. For example, such CFOs may be employed by the transmitting wireless communication device itself and/or by one or more receiving wireless communication devices.

Referring to method 2201 of FIG. 22B, the method 2201 describes operations as may be performed within a receiving wireless communication device. From a transmitting wireless communication device, the method 2201 operates such that wireless communication devices receiving a first multi-user packet including CFOs therein, as shown in a block 2211. Within each receiving wireless communication device, the method 2201 then operates by extracting a respective one of the CFOs (e.g., corresponding to this particular receiving wireless communication device), as shown in a block 2221. Within each receiving wireless communication device, the method 2201 continues by employing the respective one of the CFOs for performing CFO-compensation for at least one subsequent communication sent to the transmitting wireless communication device, as shown in a block 2231. The method 2201 then operates such that the receiving wireless communication devices transmitting a second multi-user packet to the transmitting wireless communication device, as shown in a block 2241.

Figures 23A, 23B:
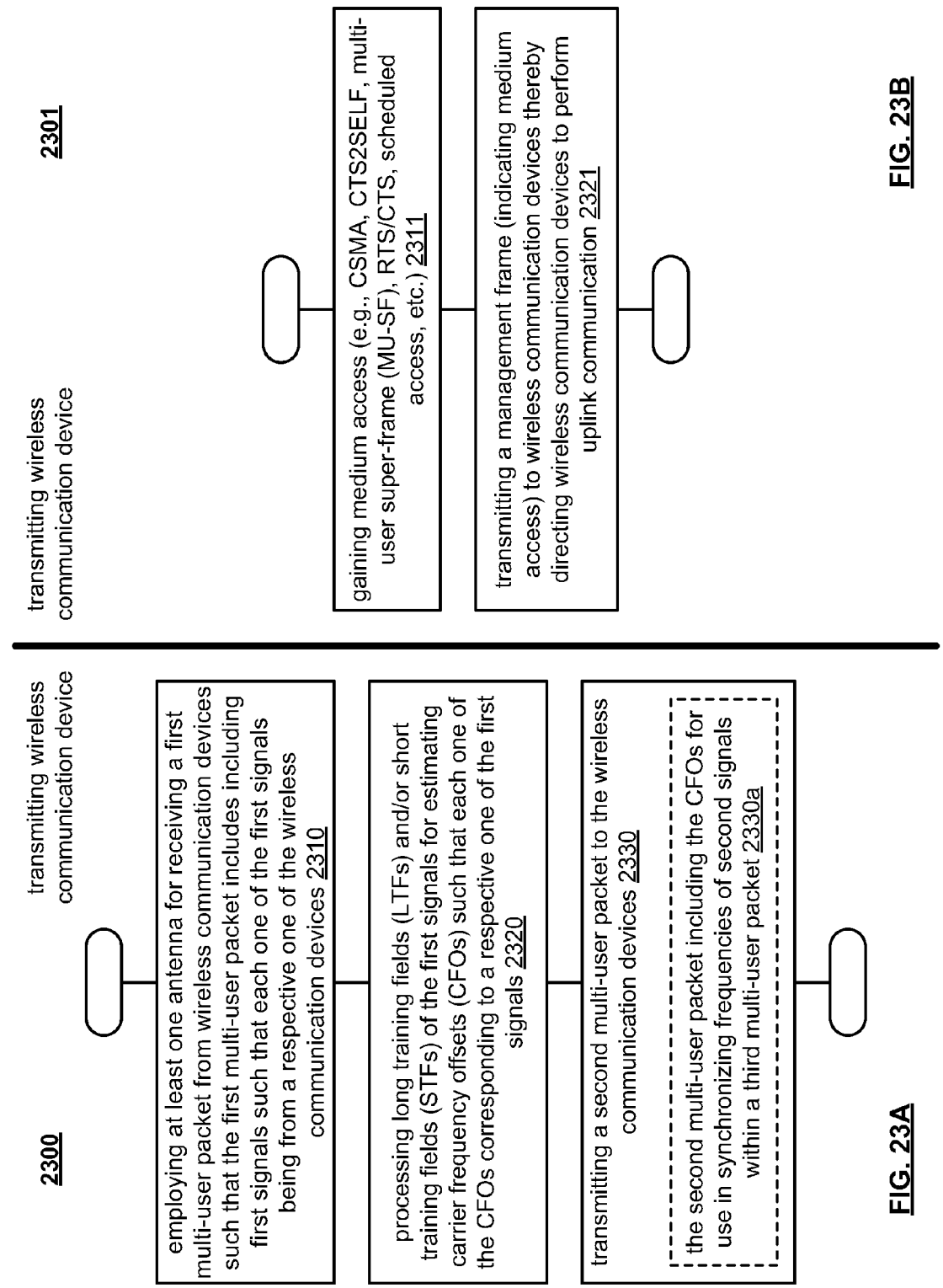

Referring to method 2300 of FIG. 23A, the method 2300 describes operations as may be performed within a transmitting wireless communication device. The method 2300 begins by employing at least one antenna for receiving a first multi-user packet from wireless communication devices such that the first multi-user packet includes including first signals such that each one of the first signals being from a respective one of the wireless communication devices, as shown in a block 2310.

The method 2300 continues by processing long training fields (LTFs) and/or short training fields (STFs) of the first signals for estimating carrier frequency offsets (CFOs) such that each one of the CFOs corresponding to a respective one of the first signals, as shown in a block 2320. The method 2300 then operates by transmitting a second multi-user packet to the wireless communication devices, as shown in a block 2330.

The second multi-user packet can include the CFOs for use in synchronizing frequencies of second signals within a third multi-user packet, as shown in a block 2330a. For example, such CFOs may be employed by the transmitting wireless communication device itself and/or by one or more receiving wireless communication devices.

Referring to method 2301 of FIG. 23B, the method 2301 describes operations as may be performed within a transmitting wireless communication device. The method 2301 begins by gaining medium access (e.g., CSMA, CTS2SELF, multi-user super-frame (MU-SF), RTS/CTS, scheduled access, etc.), as shown in a block 2311. The method 2301 then operates by transmitting a management frame (indicating medium access) to wireless communication devices thereby directing wireless communication devices to perform uplink communication, as shown in a block 2321.

Referring to method 2400 of FIG. 24A, the method 2400 describes operations as may be performed within a transmitting wireless communication device. The method 2400 begins by combining a management frame with CFOs thereby generating a multi-user packet (e.g., modifying a management frame or multi-user packet to include CFOs therein), as shown in a block 2410. The method 2400 continues by transmitting the multi-user packet to the wireless communication devices, as shown in a block 2420.

The multi-user packet can include the CFOs for use in synchronizing frequencies of second signals within at least one additional multi-user packet, as shown in a block 2420a. For example, such CFOs may be employed by the transmitting wireless communication device itself and/or by one or more receiving wireless communication devices.

Referring to method 2401 of FIG. 24B, the method 2401 describes operations as may be performed within a transmitting wireless communication device. The method 2401 begins by aggregating data intended for at least one receiving wireless communication device with CFOs thereby generating a multi-user packet (e.g., modifying a management frame or multi-user packet to include CFOs therein), as shown in a block 2411. The method 2401 then operates by transmitting the multi-user packet to the wireless communication devices, as shown in a block 2421.

The multi-user packet can include the CFOs for use in synchronizing frequencies of second signals within at least one additional multi-user packet, as shown in a block 2421a. For example, such CFOs may be employed by the transmitting wireless communication device itself and/or by one or more receiving wireless communication devices.

Referring to method 2500 of FIG. 25A, the method 2500 describes operations as may be performed within a transmitting wireless communication device. Based on capabilities of wireless communication devices (e.g., respective capabilities of individual wireless communication devices, respective capabilities of groups of wireless communication devices, etc.), the method 2500 begins by identifying or determining a time period (e.g., maximum time) for a multi-user (MU) uplink communication, as shown in a block 2510. The method 2500 continues by including the time period within a multi-user packet or a single-user packet (e.g., data frame, management frame, to be transmitted globally or individually to wireless communication devices, etc.), as shown in a block 2520. The method 2500 then operates by transmitting the multi-user packet or the single-user packet to the wireless communication device(s), as shown in a block 2530.

Referring to method 2501 of FIG. 25B, the method 2501 describes operations as may be performed within a transmitting wireless communication device. The method 2501 begins by receiving (or transmitting) a first signal from (to) a first wireless communication device using a first antenna, as shown in a block 2511. The method 2501 then operates by receiving (or transmitting) a second signal from (to) a second wireless communication device using a second antenna, as shown in a block 2521.

Referring to method 2502 of FIG. 25C, the method 2502 describes operations as may be performed within a transmitting or receiving wireless communication device. The method 2502 begins by receiving (or transmitting) a first signal from (to) a first wireless communication device via a first cluster, as shown in a block 2512. The method 2502 continues by receiving (or transmitting) a second signal from (to) a second wireless communication device via a second cluster, as shown in a block 2522. Any desired combination of cluster and/or antenna may be employed in communicating and receiving signals between various wireless communication devices.

It is noted that the various modules, circuitries, functional blocks, etc. (e.g., for encoding, for decoding, for baseband processing, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

| PSD Mask | 1 |
|---|---|
| Frequency Offset | dBr |
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| TX Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10

| PSD Mask | 2 |
|---|---|
| Frequency Offset | dBr |
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for operating an access point device, the method comprising:
    after gaining medium access, transmitting a management frame to indicate the medium access;
    from a plurality of wireless communication devices, employing at least one of a plurality of antennae of the access point device for receiving, in response to the management frame, a first multi-user packet including a first plurality of signals such that each one of the first plurality of signals being from a respective one of the plurality of wireless communication devices;
    based on the first plurality of signals, calculating a plurality of carrier frequency offsets (CFOs) such that each one of the plurality of CFOs corresponding to a respective one of the first plurality of signals;
    transmitting a second multi-user packet to the plurality of wireless communication devices, wherein the second multi-user packet including the plurality of CFOs for use in synchronizing frequencies of a second plurality of signals with respect to the access point device within a third multi-user packet; and
    based on a plurality of capabilities of the plurality of wireless communication devices, determining a time period for the plurality of wireless communication devices transmitting the third multi-user packet to the wireless access point device.

2. The method of claim 1, wherein:
    at least one of the first multi-user packet, the second multi-user packet, and the third multi-user packet being a multiple input multiple output (MU-MIMO) packet or an orthogonal frequency division multiple access (OFDMA) packet.

3. The method of claim 1, further comprising:
    each of the plurality of wireless communication devices receiving the second multi-user packet;
    each of the plurality of wireless communication devices employing a respective one of the plurality of CFOs for generating a respective one of the second plurality of second signals being CFO-compensated; and
    the plurality of wireless communication devices transmitting the third multi-user packet to the wireless access point device.

4. The method of claim 1, further comprising:
    aggregating data intended for at least one of the plurality of wireless communication devices with the plurality of CFOs thereby generating the second multi-user packet.

5. The method of claim 1, further comprising:
combining another management frame corresponding to at least one of the plurality of wireless communication devices with the plurality of CFOs thereby generating the second multi-user packet.

6. The method of claim 1, further comprising:
receiving the first plurality of signals of the first multi-user packet via a plurality of clusters such each of the first plurality of signals being received via a respective one of the plurality of clusters.

7. The method of claim 1, further comprising:
employing the plurality of antennae of the access point device for receiving the first plurality of signals of the first multi-user packet such each of the first plurality of signals being received via a respective one of the plurality of antennae.

8. The method of claim 1, wherein:
the plurality of wireless communication devices being a plurality of wireless stations (STAs).

9. A method for operating a wireless communication device, the method comprising:
gaining medium access;
after gaining the medium access, employing a first at least one of a plurality of antennae of the wireless communication device for transmitting a first multi-user packet to a plurality of wireless communication devices, wherein the first multi-user packet indicating the wireless communication device having the medium access;
from the plurality of wireless communication devices, employing a second at least one of the plurality of antennae of the wireless communication device for receiving a second multi-user packet including a first plurality of signals such that each one of the first plurality of signals being from a respective one of the first plurality of wireless communication devices;
based on the first plurality of signals:
determining a plurality of capabilities of the plurality of wireless communication devices such that each of the plurality of capabilities corresponding to a respective one of the plurality of wireless communication devices;
based on the plurality of capabilities, determining a time period for an uplink multi-user multiple input multiple output (MU-MIMO) communication from the plurality of wireless communication devices; and
calculating, by the wireless communication device, a plurality of carrier frequency offsets (CFOs) such that each one of the plurality of CFOs corresponding to a respective one of the first plurality of signals; and
transmitting a third multi-user packet to the plurality of wireless communication devices, wherein the third multi-user packet including the time period and the plurality of CFOs for use in synchronizing frequencies of a second plurality of signals with respect to the wireless communication device within a fourth multi-user packet.

10. The method of claim 9, wherein:
at least one of the first multi-user packet, the second multi-user packet, the third multi-user packet, and the fourth multi-user packet being a multiple input multiple output (MU-MIMO) packet or an orthogonal frequency division multiple access (OFDMA) packet.

11. The method of claim 9, wherein:
the second at least one of the plurality of antennae of the wireless communication device being the first at least one of the plurality of antennae of the wireless communication device.

12. The method of claim 9, further comprising:
each of the plurality of wireless communication devices receiving the third multi-user packet;
each of the plurality of wireless communication devices employing a respective one of the plurality of CFOs for generating a respective one of the second plurality of second signals being CFO-compensated; and
the plurality of wireless communication devices transmitting the third multi-user packet to wireless communication device.

13. The method of claim 9, further comprising:
aggregating data intended for at least one of the plurality of wireless communication devices with the plurality of CFOs thereby generating the third multi-user packet.

14. The method of claim 9, further comprising:
combining a management frame corresponding to at least one of the plurality of wireless communication devices with the plurality of CFOs thereby generating the third multi-user packet.

15. The method of claim 1, wherein:
the wireless communication device being an access point (AP); and
the plurality of wireless communication devices being a plurality of wireless stations (STAs).

16. An apparatus, comprising:
a plurality of antennae, wherein following gaining medium access, at least one of the plurality of the antennae transmitting a management frame indicating the apparatus has the medium access and receiving a first multi-user packet including a first plurality of signals such that each one of the first plurality of signals being from a respective one of a plurality of wireless communication devices;
a baseband processing module for, based on the first plurality of signals, calculating a plurality of carrier frequency offsets (CFOs) such that each one of the plurality of CFOs corresponding to a respective one of the first plurality of signals; and wherein:
a second at least one of the plurality of the antennae transmitting a second multi-user packet to the plurality of wireless communication devices; and
the second multi-user packet including the plurality of CFOs for use in synchronizing frequencies of a second plurality of signals with respect to the apparatus within a third multi-user packet; and
the baseband processing module determining a time period for the plurality of wireless communication devices for transmitting the third multi-user packet.

17. The apparatus of claim 16, wherein:
at least one of the first multi-user packet, the second multi-user packet, and the third multi-user packet being a multiple input multiple output (MU-MIMO) packet or an orthogonal frequency division multiple access (OFDMA) packet.

18. The apparatus of claim 16, wherein:
each of the plurality of wireless communication devices receiving the second multi-user packet;
each of the plurality of wireless communication devices employing a respective one of the plurality of CFOs for generating a respective one of the second plurality of second signals being CFO-compensated; and
the plurality of wireless communication devices transmitting the third multi-user packet to apparatus.

19. The apparatus of claim 16, wherein:
the baseband processing module aggregating data intended for at least one of the plurality of wireless communication devices with the plurality of CFOs thereby generating the second multi-user packet.

20. The apparatus of claim 16, wherein:
the baseband processing module combining a another management frame corresponding to at least one of the plurality of wireless communication devices with the plurality of CFOs thereby generating the second multi-user packet.

21. The apparatus of claim 16, wherein:
the apparatus receiving the first plurality of signals of the first multi-user packet via a plurality of clusters such each of the first plurality of signals being received via a respective one of the plurality of clusters.

22. The apparatus of claim 16, wherein:
the plurality of antennae of apparatus receiving the first plurality of signals of the first multi-user packet such each of the first plurality of signals being received via a respective one of the plurality of antennae.

23. The apparatus of claim 16, wherein:
the apparatus being an access point (AP); and
the plurality of wireless communication devices being a plurality of wireless stations (STAs).

\* \* \* \* \*